United States Patent
Lombrozo

(10) Patent No.: US 8,965,691 B1
(45) Date of Patent: Feb. 24, 2015

(54) POSITION AND DIRECTION DETERMINATION USING MULTIPLE SINGLE-CHANNEL ENCODERS

(71) Applicant: Google Inc., Mountain View, CA (US)

(72) Inventor: Pete Lombrozo, Scotts Valley, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/646,406

(22) Filed: Oct. 5, 2012

(51) Int. Cl.
- *B60W 40/10* (2012.01)
- *G01P 13/04* (2006.01)
- *G01P 3/481* (2006.01)
- *G01D 5/245* (2006.01)

(52) U.S. Cl.
CPC ........... *B60W 40/10* (2013.01); *B60W 2520/06* (2013.01); *G01D 5/2457* (2013.01); *G01P 3/481* (2013.01); *G01P 13/04* (2013.01); *G01P 13/045* (2013.01)
USPC ................................. 701/498; 701/26; 701/41

(58) Field of Classification Search
CPC ............. B60W 2520/06; B60W 40/10; G01D 5/2457; G01P 3/481; G01P 13/04; G01P 13/045
USPC ............ 701/26, 69, 70, 116, 29.1, 30.5, 30.6, 701/41, 498, 23
See application file for complete search history.

(56) References Cited

U.S. PATENT DOCUMENTS

| | | | | |
|---|---|---|---|---|
| 2,988,695 A * | 6/1961 | Leavitt | ......................... | 324/76.52 |
| 3,787,769 A * | 1/1974 | Parkinson | ...................... | 324/174 |
| 3,930,201 A * | 12/1975 | Ackermann et al. | ........... | 307/106 |
| 4,264,866 A * | 4/1981 | Benes | ................................ | 327/3 |
| 4,331,917 A * | 5/1982 | Render et al. | .................. | 324/166 |
| 4,966,250 A * | 10/1990 | Imaseki | ......................... | 180/233 |
| 5,007,069 A * | 4/1991 | VanEss | ........................... | 375/324 |
| 5,229,941 A * | 7/1993 | Hattori | ............................ | 701/26 |
| 5,402,365 A * | 3/1995 | Kozikaro et al. | ............... | 702/97 |
| 5,410,481 A * | 4/1995 | Kriz | ................................. | 701/23 |
| 5,459,398 A * | 10/1995 | Hansen et al. | ................. | 324/166 |
| 5,459,732 A | 10/1995 | Wise et al. | | |
| 5,471,361 A * | 11/1995 | Wootton | ........................ | 361/236 |
| 5,485,379 A * | 1/1996 | Kremer | ............................ | 701/71 |
| 5,494,344 A * | 2/1996 | Heyn et al. | ..................... | 303/140 |
| 5,557,552 A * | 9/1996 | Naito et al. | .................... | 702/148 |
| 5,797,664 A * | 8/1998 | Tagawa | .......................... | 303/190 |
| 5,826,207 A * | 10/1998 | Ohashi et al. | ................... | 701/36 |
| 5,869,962 A * | 2/1999 | Kasumi et al. | ........... | 324/207.21 |
| 5,982,279 A * | 11/1999 | Tominaga et al. | ............. | 340/444 |
| 6,021,382 A | 2/2000 | Greenwell et al. | | |

(Continued)

OTHER PUBLICATIONS

Bohlooi et al., "Detecting the Vehicle Direction Changes for Routing Algorithms and Applications of Vehicular Ad Hoc Networks," IEEJ Trans 2012; 7: pp. 329-333.

*Primary Examiner* — Calvin Cheung
*Assistant Examiner* — Allen E Quillen
(74) *Attorney, Agent, or Firm* — McDonnell Boehnen Hulbert & Berghoff LLP

(57) ABSTRACT

A system for an autonomous vehicle is disclosed that combines information from single-channel encoders serving as wheel speed sensors on multiple wheels of the vehicle. A pattern of the outputs from the single-channel encoders is characterized while the vehicle is traveling in a first direction. A shift in the characterized pattern is associated with a change in direction of the autonomous vehicle. Such detection of changes in direction can be used to determine the position of the vehicle at low speeds or while starting and/or stopping where the vehicle can potentially rock back and forth.

20 Claims, 8 Drawing Sheets

(56) References Cited

U.S. PATENT DOCUMENTS

| | | | |
|---|---|---|---|
| 6,151,539 A * | 11/2000 | Bergholz et al. | 701/25 |
| 6,208,131 B1 * | 3/2001 | Cebis et al. | 324/165 |
| 6,232,739 B1 * | 5/2001 | Krefta et al. | 318/652 |
| 6,466,887 B1 * | 10/2002 | Weinbrenner | 702/141 |
| 6,498,474 B1 * | 12/2002 | Turner | 324/165 |
| 6,559,634 B2 * | 5/2003 | Yamada | 324/174 |
| 6,591,668 B1 * | 7/2003 | Becherer et al. | 73/146 |
| 6,606,549 B1 * | 8/2003 | Murakami et al. | 701/89 |
| 6,941,225 B2 * | 9/2005 | Upadhyaya et al. | 701/470 |
| 6,969,986 B2 * | 11/2005 | Schmid et al. | 324/166 |
| 6,999,859 B2 * | 2/2006 | Kin | 701/1 |
| 7,116,096 B2 * | 10/2006 | Waszkowski et al. | 324/178 |
| 7,145,441 B2 * | 12/2006 | Knoop et al. | 340/435 |
| 7,174,241 B2 * | 2/2007 | Tsuruhara et al. | 701/1 |
| 7,205,761 B2 * | 4/2007 | Tsukamoto et al. | 324/179 |
| 7,205,886 B2 * | 4/2007 | Kin | 340/442 |
| 7,262,591 B2 * | 8/2007 | Blossfeld | 324/166 |
| 7,278,511 B1 * | 10/2007 | Gass et al. | 180/409 |
| 7,693,640 B2 * | 4/2010 | Watanabe | 701/72 |
| 7,735,360 B2 * | 6/2010 | Dian et al. | 73/114.26 |
| 8,126,642 B2 * | 2/2012 | Trepagnier et al. | 701/423 |
| 8,138,752 B2 * | 3/2012 | Uenoyama | 324/207.25 |
| 8,164,324 B2 * | 4/2012 | Hara et al. | 324/166 |
| 8,191,975 B2 | 6/2012 | Amato | |
| 8,280,623 B2 * | 10/2012 | Trepagnier et al. | 701/301 |
| 8,332,103 B2 * | 12/2012 | Greer et al. | 701/49 |
| 8,332,104 B2 * | 12/2012 | Greer et al. | 701/49 |
| 8,346,480 B2 * | 1/2013 | Trepagnier et al. | 701/514 |
| 8,370,024 B2 * | 2/2013 | Irth et al. | 701/41 |
| 8,390,273 B2 * | 3/2013 | Grose et al. | 324/207.11 |
| 8,412,449 B2 * | 4/2013 | Trepagnier et al. | 701/301 |
| 2003/0051933 A1 * | 3/2003 | Bell | 180/170 |
| 2004/0024564 A1 * | 2/2004 | Baize | 702/151 |
| 2004/0100251 A1 * | 5/2004 | Lohberg | 324/166 |
| 2005/0007103 A1 * | 1/2005 | Schroeder et al. | 324/207.25 |
| 2005/0209762 A1 * | 9/2005 | Lu et al. | 701/70 |
| 2008/0086240 A1 * | 4/2008 | Breed | 701/1 |
| 2010/0057396 A1 * | 3/2010 | Oblizajek et al. | 702/147 |
| 2010/0185361 A1 * | 7/2010 | Irth et al. | 701/34 |
| 2010/0283417 A1 * | 11/2010 | Holzmann et al. | 318/400.13 |
| 2011/0218706 A1 * | 9/2011 | Mori et al. | 701/36 |
| 2011/0238268 A1 * | 9/2011 | Watanabe | 701/48 |
| 2011/0257882 A1 * | 10/2011 | McBurney et al. | 701/208 |
| 2011/0264301 A1 * | 10/2011 | Henken et al. | 701/1 |
| 2012/0010777 A1 * | 1/2012 | Allard | 701/32.7 |
| 2012/0016615 A1 * | 1/2012 | Carpaij et al. | 702/96 |
| 2012/0029767 A1 * | 2/2012 | Bailie et al. | 701/36 |
| 2012/0041644 A1 * | 2/2012 | Turner | 701/41 |
| 2012/0041658 A1 * | 2/2012 | Turner | 701/68 |
| 2012/0234087 A1 * | 9/2012 | Strahan et al. | 73/146.3 |
| 2012/0242502 A1 * | 9/2012 | Steiner et al. | 340/870.07 |
| 2012/0277957 A1 * | 11/2012 | Inoue et al. | 701/41 |
| 2012/0296567 A1 * | 11/2012 | Breed | 701/468 |
| 2013/0079977 A1 * | 3/2013 | Greer et al. | 701/34.4 |
| 2013/0218426 A1 * | 8/2013 | Li et al. | 701/51 |

\* cited by examiner

POSITION AND DIRECTION DETERMINATION USING MULTIPLE SINGLE-CHANNEL ENCODERS

BACKGROUND

Unless otherwise indicated herein, the materials described in this section are not prior art to the claims in this application and are not admitted to be prior art by inclusion in this section.

Vehicles can be configured to operate in an autonomous mode in which the vehicle navigates through an environment with little or no input from a driver. Such autonomous vehicles can include one or more sensors that are configured to detect information about the environment in which the vehicle operates. The vehicle and its associated computer-implemented controller use the detected information to navigate through the environment. For example, if the sensor(s) detect that the vehicle is approaching an obstacle, as determined by the computer-implemented controller, the controller adjusts the vehicle's directional controls to cause the vehicle to navigate around the obstacle.

A variety of vehicle control systems rely on information output from wheel speed sensors to provide automatic adjustments in vehicle handling and control. For example, anti-lock braking systems are electronically controlled to modify braking forces applied to each wheel in a vehicle to increase vehicle control during braking. At least in some instances, anti-lock braking systems decrease stopping distances and also allow for greater vehicle maneuverability even during braking. For example, an anti-lock brake system can be configured to detect instances where wheels are locked, indicating loss of traction, and automatically decrease braking forces applied to locked wheels.

Similarly, stability control systems, and adaptive power distribution systems can automatically adjust torque applied to different wheels to account for differential traction of some wheels due to wheel slip on loose surfaces, or to provide assistance during hard turning by selectively braking wheels based on inferred traction of each wheel indicated by the speed sensor. Some systems can also decrease rollover risks by distributing braking forces across the wheels based on the center of mass of the vehicle and steering information from the steering wheel.

Wheel speed information is provided by encoders on each wheel. A single channel encoder outputs square wave pulses with a fixed number of pulses per complete rotation of each monitored wheel. In some instances, the single channel encoders can operate by Hall Effect or magnetoresistive sensors detecting regularly spaced magnetic and/or metallic features on the rotating portion of the wheel. The frequency of the output pulses thus provides an indication of the rotation rate of the wheel. However, such square wave pulse trains do not provide an indication of the direction of rotation of the wheels. A single channel encoder does not distinguish between a feature passing the sensor in one direction and passing the sensor in the opposite direction, and so the pulse output from a wheel rotating in one direction is generally indistinguishable from the pulse output with the wheel rotating in the opposite direction.

Dual channel encoders can distinguish direction of rotation by including a second sensor that detects a second set of features on the rotating wheel. The second set of features is axially offset from the first such that the order of detection of the two sets of features is different when the wheel rotates forward than when it rotates backward. Thus, dual channel encoders provide both speed and direction information, but require additional hardware and associated cost.

SUMMARY

A system for an autonomous vehicle is disclosed that combines information from single-channel encoders serving as wheel speed sensors on multiple wheels of the vehicle. A pattern of the outputs from the single-channel encoders is characterized while the vehicle is traveling in a first direction. A shift in the characterized pattern is associated with a change in direction of the autonomous vehicle. Such detection of changes in direction can be used to determine the position of the vehicle at low speeds or while starting and/or stopping where the vehicle can potentially rock back and forth.

Some embodiments of the present disclosure provide a method including receiving a first data stream from a first single channel encoder associated with a first wheel of a vehicle. The first data stream can be indicative of a first regularly repeating pattern with a frequency based on a rate of rotation of the first wheel. The method can include receiving a second data stream from a second single channel encoder associated with a second wheel of the vehicle. The second data stream can be indicative of a second regularly repeating pattern with a frequency based on a rate of rotation of the second wheel. The method can include characterizing a time series relationship between the first and second regularly repeating patterns during a first time window corresponding to motion of the vehicle in a first direction. The method can include identifying a shift in the characterized time series relationship corresponding to a reversal in rotation direction of the first and second wheels during a second time window following the first time window. The method can include determining the vehicle is moving in a second direction substantially opposite the first direction responsive to identifying the shift.

Some embodiments of the present disclosure provide an autonomous vehicle system. The autonomous vehicle system can include a first single channel encoder associated with a first wheel of the autonomous vehicle. The first single channel encoder can be configured to generate a data stream indicative of a regularly repeating pattern with a frequency based on a rate of rotation of the first wheel. The autonomous vehicle system can include a second single channel encoder associated with a second wheel of the autonomous vehicle. The second single channel encoder can be configured to generate a data stream indicative of a regularly repeating pattern with a frequency based on a rate of rotation of the second wheel. The autonomous vehicle system can include a controller. The controller can be configured to characterize a time series relationship between the first and second regularly repeating patterns during a first time window corresponding to motion of the vehicle in a first direction. The controller can be configured to identify a shift in the characterized time series relationship corresponding to a reversal in rotation direction of the first and second wheels during a second time window following the first time window. The controller can be configured to determine the vehicle is moving in a second direction substantially opposite the first direction responsive to identifying the shift in the characterized time series relationship.

Some embodiments of the present disclosure provide a computer readable medium storing instructions that, when executed by one or more processors in a computing device, cause the computing device to perform operations. The operations can include receiving a first data stream from a first single channel encoder associated with a first wheel of a vehicle. The first data stream can be indicative of a first regularly repeating pattern with a frequency based on a rate of rotation of the first wheel. The operations can include receiving a second data stream from a second single channel encoder associated with a second wheel of the vehicle. The second data stream can be indicative of a second regularly repeating pattern with a frequency based on a rate of rotation of the second wheel. The operations can include characterizing a time series relationship between the first and second regularly repeating patterns during a first time window corresponding to motion of the vehicle in a first direction. The operations can include identifying a shift in the characterized time series relationship corresponding to a reversal in rotation direction of the first and second wheels during a second time window following the first time window. The operations can include determining the vehicle is moving in a second direction substantially opposite the first direction responsive to identifying the shift.

These as well as other aspects, advantages, and alternatives, will become apparent to those of ordinary skill in the art by reading the following detailed description, with reference where appropriate to the accompanying drawings.

DETAILED DESCRIPTION

Figure 1:
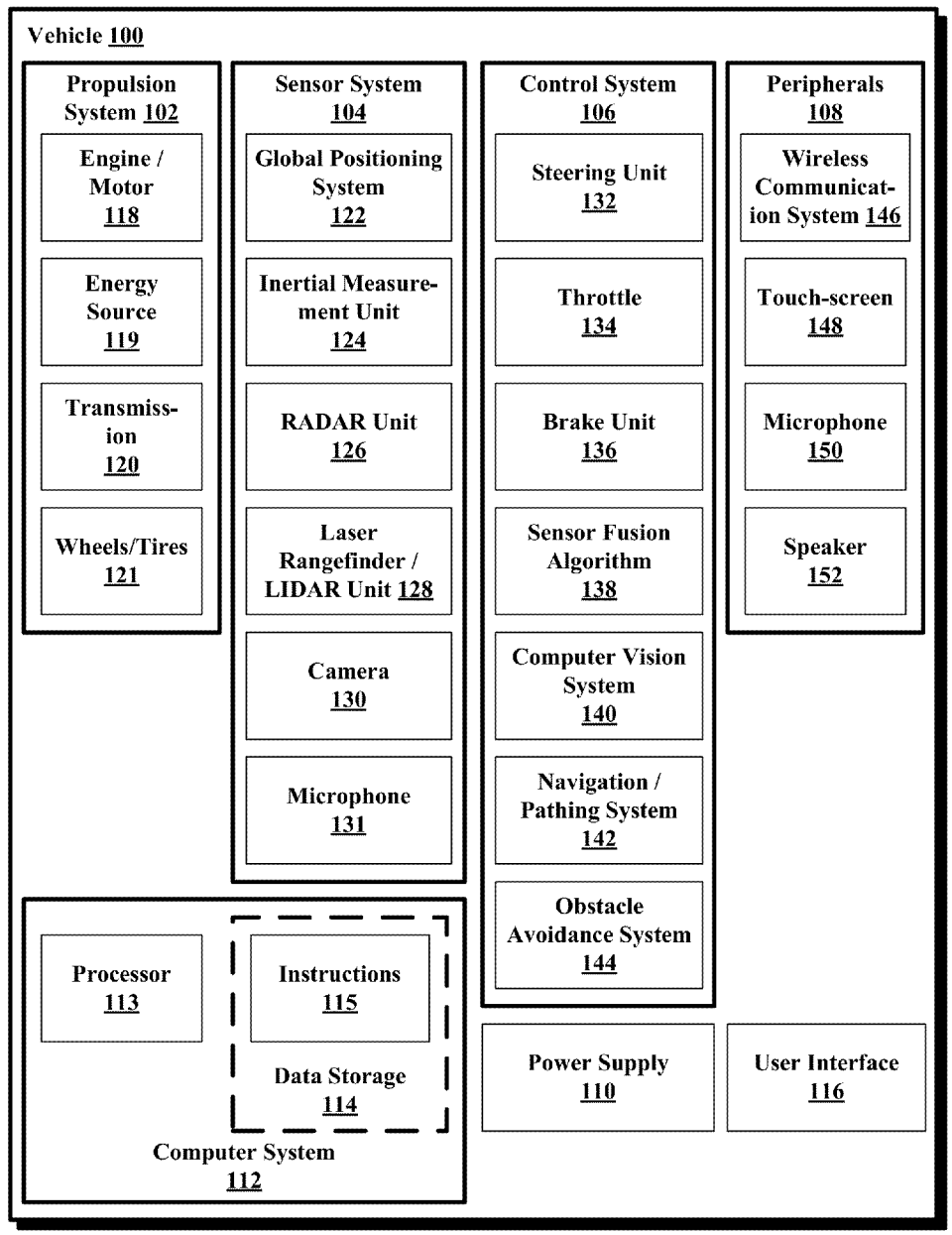
FIG. 1 is a functional block diagram depicting aspects of an autonomous vehicle.

Example embodiments relate to an autonomous vehicle, such as a driverless automobile, that includes a single channel encoders on each wheel configured as wheel speed sensors. The single channel encoders each output a pulse stream with a frequency based on the speed of the wheel. For example, the outputs can provide a fixed number of pulses per complete rotation of each wheel. The output from each single channel encoder indicates wheel speed, but not direction.

Some embodiments of the present disclosure provide for combining information from more than one of the single channel encoder outputs allows for detection of changes in direction. For example, a time-series relationship, or event order, of pulse stream events from a pair of single channel encoders can be characterized while the vehicle moves in a first direction. Upon reversal of direction of the autonomous vehicle, the order of the characterized pulse stream events reverse order. Combining outputs from four single channel encoders provides a redundant solution to allow for robust detection of direction changes. A controller analyzes the outputs from the single channel encoders to identify changes in direction. Furthermore, the controller can monitor the speed of the vehicle as indicated by the single channel encoder outputs and estimate vehicle displacement based on the combination of speed and direction information. The displacement information can be used by the autonomous vehicle to inform a position estimation of the autonomous vehicle. In some examples the position estimation based on the single channel encoder outputs can be combined with one or more additional position information sensors such as global positioning systems, RADAR systems, inertial motion detection systems, etc. The controller can be configured to determine how to direct propulsion systems of the autonomous vehicle to affect a navigation path/route of the vehicle based on the position information inferred by the single channel encoders.

The technique can be employed by an autonomous vehicle to detect subtle forward and backward rocking movements of the autonomous vehicle at low speeds or while starting and/or stopping. For example, during a parking maneuver the autonomous vehicle can gradually ease forward and then settle backward, particularly if on an incline. Detecting such low speed changes in direction can be used to monitor the position of the autonomous vehicle at low speeds.

In some examples the outputs from the single channel encoders can include a data stream can be a series of square wave pulses that alternate between high and low to indicate fixed portions of the rotating wheels passing a fixed sensor. While the vehicle is traveling in a straight line, the rotation rates of any two wheels will be roughly equal (although subtle differential rotation can occur to variations in tire wear, etc.), but in general the pulse streams from single channel encoders on the two wheels are not temporally aligned, unless by coincidence. Thus, there is generally a slight offset between otherwise similar pulse streams from single channel encoders on two different wheels due to random variations in alignment of the pulse generating features with respect to their respective encoders. As a result of the random temporal offsets between the pulse train signals from each wheel, the order of the pulses on each wheel with respect to one another can be associated with motion of the vehicle in one direction.

Some embodiments of the present disclosure provide for monitoring the pulse train outputs from single channel encoders on two or more wheels of an autonomous vehicle and detecting a change in direction of the vehicle by observing a reversal in the order of events in the pulse train. By combining the outputs from single channel encoders on multiple wheels, and observing the sequence of the pulse train events with respect to one another, changes in direction of the vehicle is detected with accuracy and reliability.

Information from other sensors on board the autonomous vehicle can be combined with the direction change information to determine which order of the pulse train events corresponds to forward motion of the vehicle, and which corresponds to reverse motion of the vehicle. For example, sensors on the drive train can inform the processor that the vehicle is in drive (or reverse) while a particular time series pattern is observed. Additionally or alternatively video, RADAR, inertial motion detectors, global positioning systems, and/or LIDAR sensors can inform the processor that the vehicle is moving forward or backward while a particular time series pattern is observed.

Monitoring and detecting changes in direction of the vehicle thus allows for accurate estimates of vehicle displacement and vehicle position. The technique can be employed at low speeds, such as during parking maneuvers where monitoring displacement of the autonomous vehicle at centimeter-scale resolution allows for precisely maneuvering the vehicle around other vehicles and environmental obstacles. In addition, subtle forward and backward rocking of the vehicle while starting and stopping the vehicle on a hill can be accurately monitored. For example, a series of starts and stops where the vehicle is monotonically progressing forward can be distinguished from a series of rocking forward and backward while a vehicle starts out on a steep uphill grade.

Generally, any one pattern of pulse train events is only maintained so long as there is no slippage between any of the wheels and the vehicle travels in a roughly straight line such that the order of events is not influenced by sudden skips on particular wheels (due to loss of traction) or differential changes in frequency amongst the wheels (due to turning). Thus, some embodiments of the present disclosure allow for repeated calibrations of the expected pulse train events, such that subsequent reversals in the observed events can be detected over a relatively short duration where effects of loss of traction or turning are expected to be tolerable. In some examples, the expected pulse train sequence is calibrated while the vehicle is approaching a low speed scenario, such as while the vehicle is slowing to a stop.

In some embodiments, the lag between pulse trains on any two wheels is expressed as a relative phase offset that relates the two pulse streams to one another. Upon reversal in direction of the vehicle, the relative phase offset between the two pulse streams changes sign. Thus, the detection of change in direction can be indicated by observing a change in sign in relative phase offset between any two wheels. Using the single channel encoder pulse streams from all four wheels allows for detection of direction reversal with a high degree of redundancy and precision.

In addition, some embodiments provide for determining the bearing of an autonomous vehicle by comparing single channel wheel sensor outputs from wheels on opposite sides of the vehicle. While the vehicle is traveling a straight line, the rotation rates of wheels on opposite sides of the vehicle are generally equal. There may be a slight difference attributable to slightly different tire sizes such as occurs with mismatching tires or differential tire wear, but such a slight difference can be accounted for by calibration. The wheel speeds are compared while the vehicle is heading straight to provide a baseline calibration for the expected frequency difference, if any, while the vehicle is moving straight.

The differential wheel speed between the left side and right side of the vehicle can be monitored for deviations from the straight line expected values. Observing higher frequencies on the right side wheels than the left side wheels indicates a left turn, because the right side travels a larger radius of curvature than the left side. On the other hand, observing higher frequencies on the left side wheels than the right side wheels indicates a right turn, because the left side travels a larger radius of curvature than the right side. Extracting the difference in rotation frequency can thus allow for tracking the displacement of the vehicle with even greater accuracy based on vehicle speed, direction, and bearing, all of which can be extracted from analysis of the single channel encoders on each wheel, once properly calibrated.

In some embodiments, the example system may include one or more processors, one or more forms of memory, one or more input devices/interfaces, one or more output devices/interfaces, and machine-readable instructions that when executed by the one or more processors cause the system to carry out the various functions, tasks, capabilities, etc., described above.

Some aspects of the example methods described herein may be carried out in whole or in part by an autonomous vehicle or components thereof. However, some example methods may also be carried out in whole or in part by a system or systems that are remote from an autonomous vehicle. For instance, an example method could be carried out in part or in full by a server system, which receives information from sensors (e.g., raw sensor data and/or information derived therefrom) of an autonomous vehicle. Other examples are also possible.

Example systems within the scope of the present disclosure will now be described in greater detail. An example system may be implemented in, or may take the form of, an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, and trolleys. Other vehicles are possible as well.

FIG. 1 is a functional block diagram illustrating a vehicle 100 according to an example embodiment. The vehicle 100 is configured to operate fully or partially in an autonomous mode, and thus may be referred to as an "autonomous vehicle." For example, a computer system 112 can control the vehicle 100 while in an autonomous mode via control instructions to a control system 106 for the vehicle 100. The computer system 112 can receive information from one or more sensor systems 104, and base one or more control processes (such as setting a heading so as to avoid a detected obstacle) upon the received information in an automated fashion. The sensor systems 104 can include, for example, sensors for monitoring steering wheel position ("orientation") and/or wheel position (e.g., orientation of front wheels). For example encoders associated with electronic stability control systems and/or anti-lock brake systems can be configured as wheel speed sensors, position/orientation sensors, etc. The sensor systems 104 can also include one or more communication interfaces to interrogate such sensors, such as through a communication bus (e.g., CAN bus) of the vehicle 100.

The autonomous vehicle 100 can be fully autonomous or partially autonomous. In a partially autonomous vehicle some functions can optionally be manually controlled (e.g., by a driver) some or all of the time. Further, a partially autonomous vehicle can be configured to switch between a fully-manual operation mode and a partially-autonomous and/or a fully-autonomous operation mode.

The vehicle 100 includes a propulsion system 102, a sensor system 104, a control system 106, one or more peripherals 108, a power supply 110, a computer system 112, and a user interface 116. The vehicle 100 may include more or fewer subsystems and each subsystem can optionally include multiple components. Further, each of the subsystems and components of vehicle 100 can be interconnected and/or in communication. Thus, one or more of the functions of the vehicle 100 described herein can optionally be divided between additional functional or physical components, or combined into fewer functional or physical components. In some further examples, additional functional and/or physical components may be added to the examples illustrated by FIG. 1.

The propulsion system 102 can include components operable to provide powered motion to the vehicle 100. In some embodiments the propulsion system 102 includes an engine/motor 118, an energy source 119, a transmission 120, and wheels/tires 121. The engine/motor 118 converts energy source 119 to mechanical energy. In some embodiments, the propulsion system 102 can optionally include one or both of engines and/or motors. For example, a gas-electric hybrid vehicle can include both a gasoline/diesel engine and an electric motor.

The energy source 119 represents a source of energy, such as electrical and/or chemical energy, that may, in full or in part, power the engine/motor 118. That is, the engine/motor 118 can be configured to convert the energy source 119 to mechanical energy to operate the transmission. In some embodiments, the energy source 119 can include gasoline, diesel, other petroleum-based fuels, propane, other compressed gas-based fuels, ethanol, solar panels, batteries, capacitors, flywheels, regenerative braking systems, and/or other sources of electrical power, etc. The energy source 119 can also provide energy for other systems of the vehicle 100.

The transmission 120 includes appropriate gears and/or mechanical elements suitable to convey the mechanical power from the engine/motor 118 to the wheels/tires 121. In some embodiments, the transmission 120 includes a gearbox, a clutch, a differential, a drive shaft, and/or axle(s), etc.

The wheels/tires 121 are arranged to stably support the vehicle 100 while providing frictional traction with a surface, such as a road, upon which the vehicle 100 moves. Accordingly, the wheels/tires 121 are configured and arranged according to the nature of the vehicle 100. For example, the wheels/tires can be arranged as a unicycle, bicycle, motorcycle, tricycle, or car/truck four-wheel format. Other wheel/tire geometries are possible, such as those including six or more wheels. Any combination of the wheels/tires 121 of vehicle 100 may be operable to rotate differentially with respect to other wheels/tires 121. The wheels/tires 121 can optionally include at least one wheel that is rigidly attached to the transmission 120 and at least one tire coupled to a rim of a corresponding wheel that makes contact with a driving surface. The wheels/tires 121 may include any combination of metal and rubber, and/or other materials or combination of materials.

The sensor system 104 generally includes one or more sensors configured to detect information about the environment surrounding the vehicle 100. For example, the sensor system 104 can include a Global Positioning System (GPS) 122, an inertial measurement unit (IMU) 124, a RADAR unit 126, a laser rangefinder/LIDAR unit 128, a camera 130, and/or a microphone 131. The sensor system 104 could also include sensors configured to monitor internal systems of the vehicle 100 (e.g., $O_2$ monitor, fuel gauge, engine oil temperature, wheel speed sensors, etc.). One or more of the sensors included in sensor system 104 could be configured to be actuated separately and/or collectively in order to modify a position and/or an orientation of the one or more sensors.

The GPS 122 is a sensor configured to estimate a geographic location of the vehicle 100. To this end, GPS 122 can include a transceiver operable to provide information regarding the position of the vehicle 100 with respect to the Earth.

The IMU 124 can include any combination of sensors (e.g., accelerometers and gyroscopes) configured to sense position and orientation changes of the vehicle 100 based on inertial acceleration.

The RADAR unit 126 can represent a system that utilizes radio signals to sense objects within the local environment of the vehicle 100. In some embodiments, in addition to sensing the objects, the RADAR unit 126 and/or the computer system 112 can additionally be configured to sense the speed and/or heading of the objects.

Similarly, the laser rangefinder or LIDAR unit 128 can be any sensor configured to sense objects in the environment in which the vehicle 100 is located using lasers. The laser rangefinder/LIDAR unit 128 can include one or more laser sources, a laser scanner, and one or more detectors, among other system components. The laser rangefinder/LIDAR unit 128 can be configured to operate in a coherent (e.g., using heterodyne detection) or an incoherent detection mode.

The camera 130 can include one or more devices configured to capture a plurality of images of the environment surrounding the vehicle 100. The camera 130 can be a still camera or a video camera. In some embodiments, the camera 130 can be mechanically movable such as by rotating and/or tilting a platform to which the camera is mounted. As such, a control process of vehicle 100 may be implemented to control the movement of camera 130.

The sensor system 104 can also include a microphone 131. The microphone 131 can be configured to capture sound from the environment surrounding vehicle 100. In some cases, multiple microphones can be arranged as a microphone array, or possibly as multiple microphone arrays.

The control system 106 is configured to control operation(s) regulating acceleration of the vehicle 100 and its components. To effect acceleration, the control system 106 includes a steering unit 132, throttle 134, brake unit 136, a sensor fusion algorithm 138, a computer vision system 140, a navigation/pathing system 142, and/or an obstacle avoidance system 144, etc.

The steering unit 132 is operable to adjust the heading of vehicle 100. For example, the steering unit can adjust the axis (or axes) of one or more of the wheels/tires 121 so as to effect turning of the vehicle. The throttle 134 is configured to control, for instance, the operating speed of the engine/motor 118 and, in turn, adjust forward acceleration of the vehicle 100 via the transmission 120 and wheels/tires 121. The brake unit 136 decelerates the vehicle 100. The brake unit 136 can use friction to slow the wheels/tires 121. In some embodiments, the brake unit 136 inductively decelerates the wheels/tires 121 by a regenerative braking process to convert kinetic energy of the wheels/tires 121 to electric current.

The sensor fusion algorithm 138 is an algorithm (or a computer program product storing an algorithm) configured to accept data from the sensor system 104 as an input. The data may include, for example, data representing information sensed at the sensors of the sensor system 104. The sensor fusion algorithm 138 can include, for example, a Kalman filter, Bayesian network, etc. The sensor fusion algorithm 138 provides assessments regarding the environment surrounding the vehicle based on the data from sensor system 104. In some embodiments, the assessments can include evaluations of individual objects and/or features in the environment surrounding vehicle 100, evaluations of particular situations, and/or evaluations of possible interference between the vehicle 100 and features in the environment (e.g., such as predicting collisions and/or impacts) based on the particular situations.

The computer vision system 140 can process and analyze images captured by camera 130 to identify objects and/or features in the environment surrounding vehicle 100. The detected features/objects can include traffic signals, roadway boundaries, other vehicles, pedestrians, and/or obstacles, etc. The computer vision system 140 can optionally employ an object recognition algorithm, a Structure From Motion (SFM) algorithm, video tracking, and/or available computer vision techniques to effect categorization and/or identification of detected features/objects. In some embodiments, the computer vision system 140 can be additionally configured to map the environment, track perceived objects, estimate the speed of objects, etc.

The navigation and pathing system 142 is configured to determine a driving path for the vehicle 100. For example, the navigation and pathing system 142 can determine a series of speeds and directional headings to effect movement of the vehicle along a path that substantially avoids perceived obstacles while generally advancing the vehicle along a roadway-based path leading to an ultimate destination, which can be set according to user inputs via the user interface 116, for example. The navigation and pathing system 142 can additionally be configured to update the driving path dynamically while the vehicle 100 is in operation on the basis of perceived obstacles, traffic patterns, weather/road conditions, etc. In some embodiments, the navigation and pathing system 142 can be configured to incorporate data from the sensor fusion algorithm 138, the GPS 122, and one or more predetermined maps so as to determine the driving path for vehicle 100.

The obstacle avoidance system 144 can represent a control system configured to identify, evaluate, and avoid or otherwise negotiate potential obstacles in the environment surrounding the vehicle 100. For example, the obstacle avoidance system 144 can effect changes in the navigation of the vehicle by operating one or more subsystems in the control system 106 to undertake swerving maneuvers, turning maneuvers, braking maneuvers, etc. In some embodiments, the obstacle avoidance system 144 is configured to automatically determine feasible ("available") obstacle avoidance maneuvers on the basis of surrounding traffic patterns, road conditions, etc. For example, the obstacle avoidance system 144 can be configured such that a swerving maneuver is not undertaken when other sensor systems detect vehicles, construction barriers, other obstacles, etc. in the region adjacent the vehicle that would be swerved into. In some embodiments, the obstacle avoidance system 144 can automatically select the maneuver that is both available and maximizes safety of occupants of the vehicle. For example, the obstacle avoidance system 144 can select an avoidance maneuver predicted to cause the least amount of acceleration in a passenger cabin of the vehicle 100.

The vehicle 100 also includes peripherals 108 configured to allow interaction between the vehicle 100 and external sensors, other vehicles, other computer systems, and/or a user, such as an occupant of the vehicle 100. For example, the peripherals 108 for receiving information from occupants, external systems, etc. can include a wireless communication system 146, a touchscreen 148, a microphone 150, and/or a speaker 152.

In some embodiments, the peripherals 108 function to receive inputs for a user of the vehicle 100 to interact with the user interface 116. To this end, the touchscreen 148 can both provide information to a user of vehicle 100, and convey information from the user indicated via the touchscreen 148 to the user interface 116. The touchscreen 148 can be configured to sense both touch positions and touch gestures from a user's finger (or stylus, etc.) via capacitive sensing, resistance sensing, optical sensing, a surface acoustic wave process, etc. The touchscreen 148 can be capable of sensing finger movement in a direction parallel or planar to the touchscreen surface, in a direction normal to the touchscreen surface, or both, and may also be capable of sensing a level of pressure applied to the touchscreen surface. An occupant of the vehicle 100 can also utilize a voice command interface. For example, the microphone 150 can be configured to receive audio (e.g., a voice command or other audio input) from a user of the vehicle 100. Similarly, the speakers 152 can be configured to output audio to the user of the vehicle 100.

In some embodiments, the peripherals 108 function to allow communication between the vehicle 100 and external systems, such as devices, sensors, other vehicles, etc. within its surrounding environment and/or controllers, servers, etc., physically located far from the vehicle that provide useful information regarding the vehicle's surroundings, such as traffic information, weather information, etc. For example, the wireless communication system 146 can wirelessly communicate with one or more devices directly or via a communication network. The wireless communication system 146 can optionally use 3G cellular communication, such as CDMA, EVDO, GSM/GPRS, and/or 4G cellular communication, such as WiMAX or LTE. Additionally or alternatively, wireless communication system 146 can communicate with a wireless local area network (WLAN), for example, using WiFi. In some embodiments, wireless communication system 146 could communicate directly with a device, for example, using an infrared link, Bluetooth, and/or ZigBee. The wireless communication system 146 can include one or more dedicated short range communication (DSRC) devices that can include public and/or private data communications between vehicles and/or roadside stations. Other wireless protocols for sending and receiving information embedded in signals, such as various vehicular communication systems, can also be employed by the wireless communication system 146 within the context of the present disclosure.

As noted above, the power supply 110 can provide power to components of vehicle 100, such as electronics in the peripherals 108, computer system 112, sensor system 104, etc. The power supply 110 can include a rechargeable lithium-ion or lead-acid battery for storing and discharging electrical energy to the various powered components, for example. In some embodiments, one or more banks of batteries can be configured to provide electrical power. In some embodiments, the power supply 110 and energy source 119 can be implemented together, as in some all-electric cars.

Many or all of the functions of vehicle 100 can be controlled via computer system 112 that receives inputs from the sensor system 104, peripherals 108, etc., and communicates appropriate control signals to the propulsion system 102, control system 106, peripherals, etc. to effect automatic operation of the vehicle 100 based on its surroundings. Computer system 112 includes at least one processor 113 (which can include at least one microprocessor) that executes instructions 115 stored in a non-transitory computer readable medium, such as the data storage 114. The computer system 112 may also represent a plurality of computing devices that serve to control individual components or subsystems of the vehicle 100 in a distributed fashion.

In some embodiments, data storage 114 contains instructions 115 (e.g., program logic) executable by the processor 113 to execute various functions of vehicle 100, including those described above in connection with FIG. 1. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by vehicle 100 and computer system 112 during operation of the vehicle 100 in the autonomous, semi-autonomous, and/or manual modes to select available roadways to an ultimate destination, interpret information from the sensor system 104, etc.

The vehicle 100, and associated computer system 112, provides information to and/or receives input from, a user of vehicle 100, such as an occupant in a passenger cabin of the vehicle 100. The user interface 116 can accordingly include one or more input/output devices within the set of peripherals 108, such as the wireless communication system 146, the touchscreen 148, the microphone 150, and/or the speaker 152 to allow communication between the computer system 112 and a vehicle occupant.

The computer system 112 controls the operation of the vehicle 100 based on inputs received from various subsystems indicating vehicle and/or environmental conditions (e.g., propulsion system 102, sensor system 104, and/or control system 106), as well as inputs from the user interface 116, indicating user preferences. For example, the computer system 112 can utilize input from the control system 106 to control the steering unit 132 to avoid an obstacle detected by the sensor system 104 and the obstacle avoidance system 144. The computer system 112 can be configured to control many aspects of the vehicle 100 and its subsystems. Generally, however, provisions are made for manually overriding automated controller-driven operation, such as in the event of an emergency, or merely in response to a user-activated override, etc.

The components of vehicle 100 described herein can be configured to work in an interconnected fashion with other components within or outside their respective systems. For example, the camera 130 can capture a plurality of images that represent information about an environment of the vehicle 100 while operating in an autonomous mode. The environment may include other vehicles, traffic lights, traffic signs, road markers, pedestrians, etc. The computer vision system 140 can categorize and/or recognize various aspects in the environment in concert with the sensor fusion algorithm 138, the computer system 112, etc. based on object recognition models pre-stored in data storage 114, and/or by other techniques.

Although the vehicle 100 is described and shown in FIG. 1 as having various components of vehicle 100, e.g., wireless communication system 146, computer system 112, data storage 114, and user interface 116, integrated into the vehicle 100, one or more of these components can optionally be mounted or associated separately from the vehicle 100. For example, data storage 114 can exist, in part or in full, separate from the vehicle 100, such as in a cloud-based server, for example. Thus, one or more of the functional elements of the vehicle 100 can be implemented in the form of device elements located separately or together. The functional device elements that make up vehicle 100 can generally be communicatively coupled together in a wired and/or wireless fashion.

Figure 2:
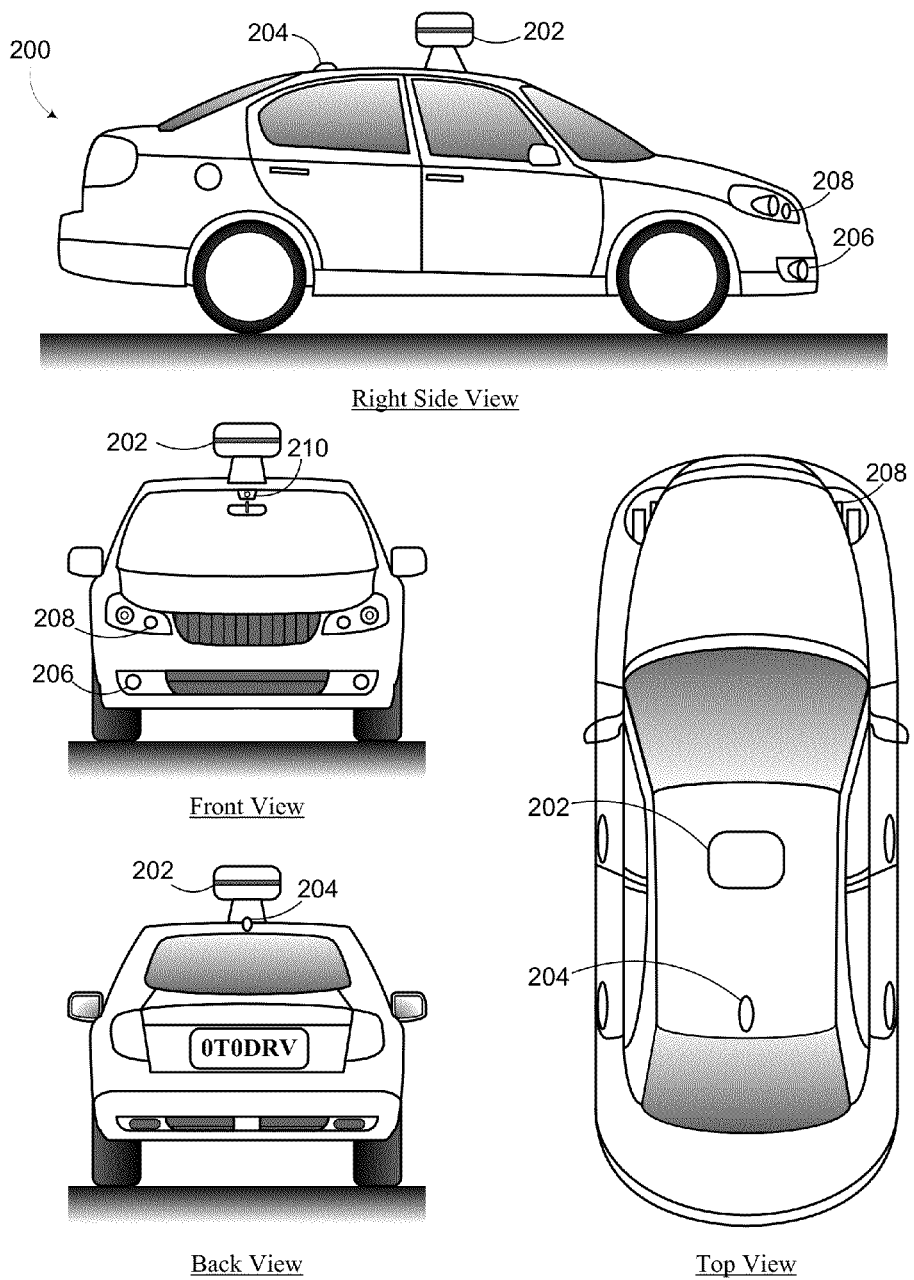
FIG. 2 depicts exterior views of an autonomous vehicle.

FIG. 2 shows an example vehicle 200 that can include some or all of the functions described in connection with vehicle 100 in reference to FIG. 1. Although vehicle 200 is illustrated in FIG. 2 as a four-wheel sedan-type car for illustrative purposes, the present disclosure is not so limited. For instance, the vehicle 200 can represent a truck, a van, a semi-trailer truck, a motorcycle, a golf cart, an off-road vehicle, or a farm vehicle, etc.

The example vehicle 200 includes a sensor unit 202, a wireless communication system 204, a LIDAR unit 206, a laser rangefinder unit 208, and a camera 210. Furthermore, the example vehicle 200 can include any of the components described in connection with vehicle 100 of FIG. 1.

The sensor unit 202 is mounted atop the vehicle 200 and includes one or more sensors configured to detect information about an environment surrounding the vehicle 200, and output indications of the information. For example, sensor unit 202 can include any combination of cameras, RADARs, LIDARs, range finders, and acoustic sensors. The sensor unit 202 can include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be moveable in a scanning fashion within a particular range of angles and/or azimuths. The sensor unit 202 could be mounted atop the roof of a car, for instance, however other mounting locations are possible. Additionally, the sensors of sensor unit 202 could be distributed in different locations and need not be collocated in a single location. Some possible sensor types and mounting locations include LIDAR unit 206 and laser rangefinder unit 208. Furthermore, each sensor of sensor unit 202 could be configured to be moved or scanned independently of other sensors of sensor unit 202.

The wireless communication system 204 could be located on a roof of the vehicle 200 as depicted in FIG. 2. Alternatively, the wireless communication system 204 could be located, fully or in part, elsewhere. The wireless communication system 204 may include wireless transmitters and receivers that could be configured to communicate with devices external or internal to the vehicle 200. Specifically, the wireless communication system 204 could include transceivers configured to communicate with other vehicles and/or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 210 can be a photo-sensitive instrument, such as a still camera, a video camera, etc., that is configured to capture a plurality of images of the environment of the vehicle 200. To this end, the camera 210 can be configured to detect visible light, and can additionally or alternatively be configured to detect light from other portions of the spectrum, such as infrared or ultraviolet light. The camera 210 can be a two-dimensional detector, and can optionally have a three-dimensional spatial range of sensitivity. In some embodiments, the camera 210 can include, for example, a range detector configured to generate a two-dimensional image indicating distance from the camera 210 to a number of points in the environment. To this end, the camera 210 may use one or more range detecting techniques.

For example, the camera 210 can provide range information by using a structured light technique in which the vehicle 200 illuminates an object in the environment with a predetermined light pattern, such as a grid or checkerboard pattern and uses the camera 210 to detect a reflection of the predetermined light pattern from environmental surroundings. Based on distortions in the reflected light pattern, the vehicle 200 can determine the distance to the points on the object. The predetermined light pattern may comprise infrared light, or radiation at other suitable wavelengths for such measurements.

The camera 210 can be mounted inside a front windshield of the vehicle 200. Specifically, the camera 210 can be situated to capture images from a forward-looking view with respect to the orientation of the vehicle 200. Other mounting locations and viewing angles of camera 210 can also be used, either inside or outside the vehicle 200.

The camera 210 can have associated optics operable to provide an adjustable field of view. Further, the camera 210 can be mounted to vehicle 200 with a movable mount to vary a pointing angle of the camera 210, such as a via a pan/tilt mechanism.

Figure 3:
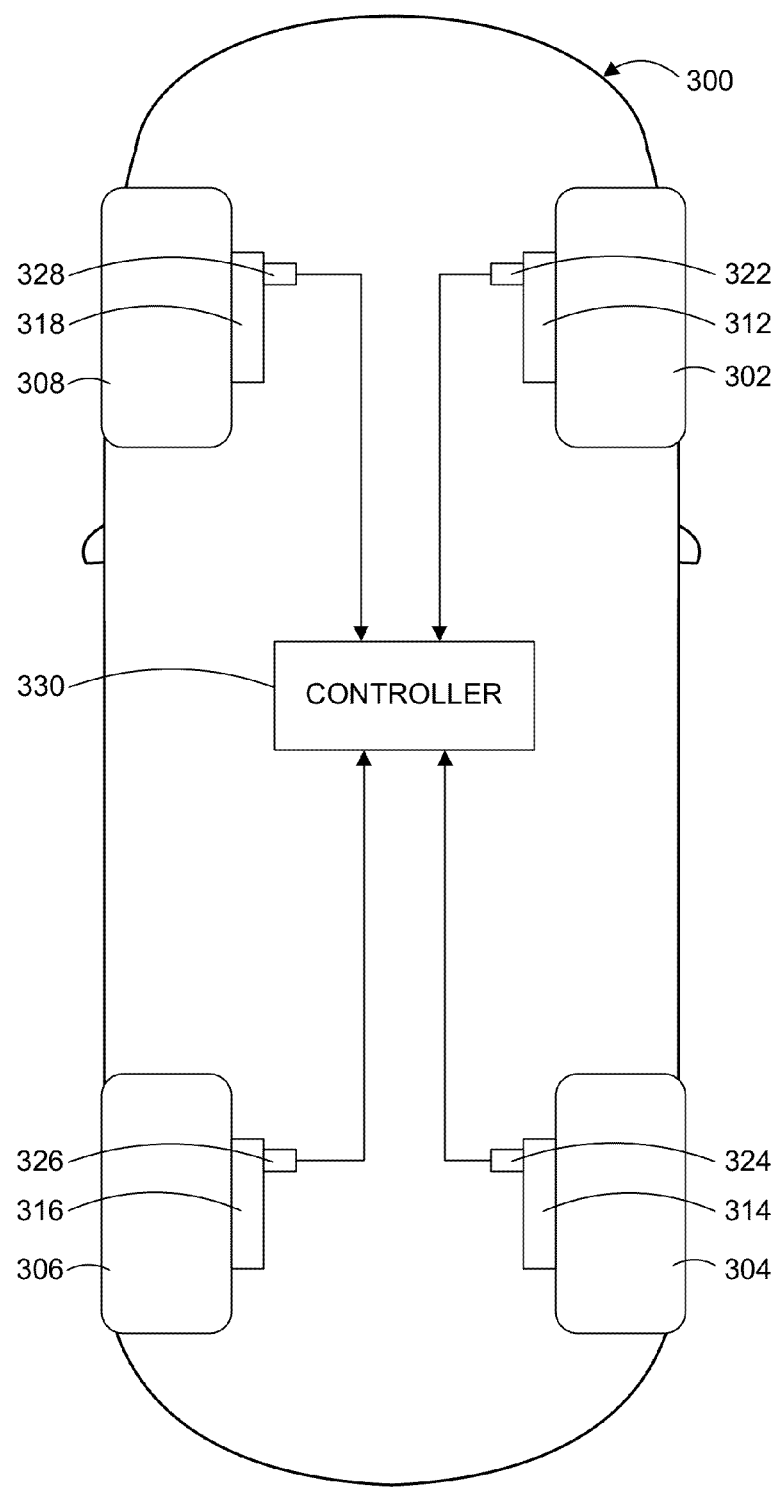
FIG. 3 is a diagram of single channel encoders connected to each wheel of the autonomous vehicle.

FIG. 3 is a diagram of single channel encoders connected to each wheel of an autonomous vehicle 300. The autonomous vehicle 300 has four tires 302, 304, 306, 308. Each of the tires 302-308 is driven by a respective wheel 312, 314, 316, 318 which rotates the tires according to a propulsion system of the vehicle 300 (e.g., a transmission, driveshaft, and/or axle to convey rotational forces to the wheels 312-318 from the motor and/or engine of the vehicle 300).

A first single channel encoder 322 is situated to provide a pulse output based on the rotation of the first wheel 312. The first single channel encoder 322 can include a sensor that provides an output signal alternating from a low level to a high level (e.g., such as in a repeating square wave) with a frequency based on the rotation rate of the wheel 312. The sensor can generate the output signal through magnetoresistive, optical, electrical contact, and/or Hall-effect sensing technologies as well as other techniques. For example, the first single channel encoder 322 can respond to a plurality of metallic and/or magnetic features axially symmetrically distributed on the wheel 312 (e.g., gear teeth, magnetic strips, etc.). In some examples, first the single channel encoder 322 outputs a fixed number of pulses (e.g., square pulses) per complete rotation of the wheel 312. Similarly, a second single channel encoder 324 is situated to provide a pulse output based on the rotation of the second wheel 314; a third single channel encoder 326 is situated to provide a pulse output based on the rotation of the third wheel 316; and a fourth single channel encoder 328 is situated to provide a pulse output based on the rotation of the fourth wheel 318. The single channel encoders 322-328 can be similar to wheel speed sensors employed in anti-lock brake systems and/or stability control systems.

The pulse outputs from the single channel encoders 322-328 are communicated to a controller 330. The controller 330 can include, for example, a processor and/or memory suitable to allow the controller 330 to execute computer-implemented functions. In some examples, the controller 330 can be implemented within the computing system 112 of the vehicle 100. The controller 330 receives the outputs from the single channel encoders 322-328 and analyzes the pulse stream outputs to detect changes in direction of the vehicle 300 as discussed in connection with the flowchart in FIG. 4 below.

Figure 4:
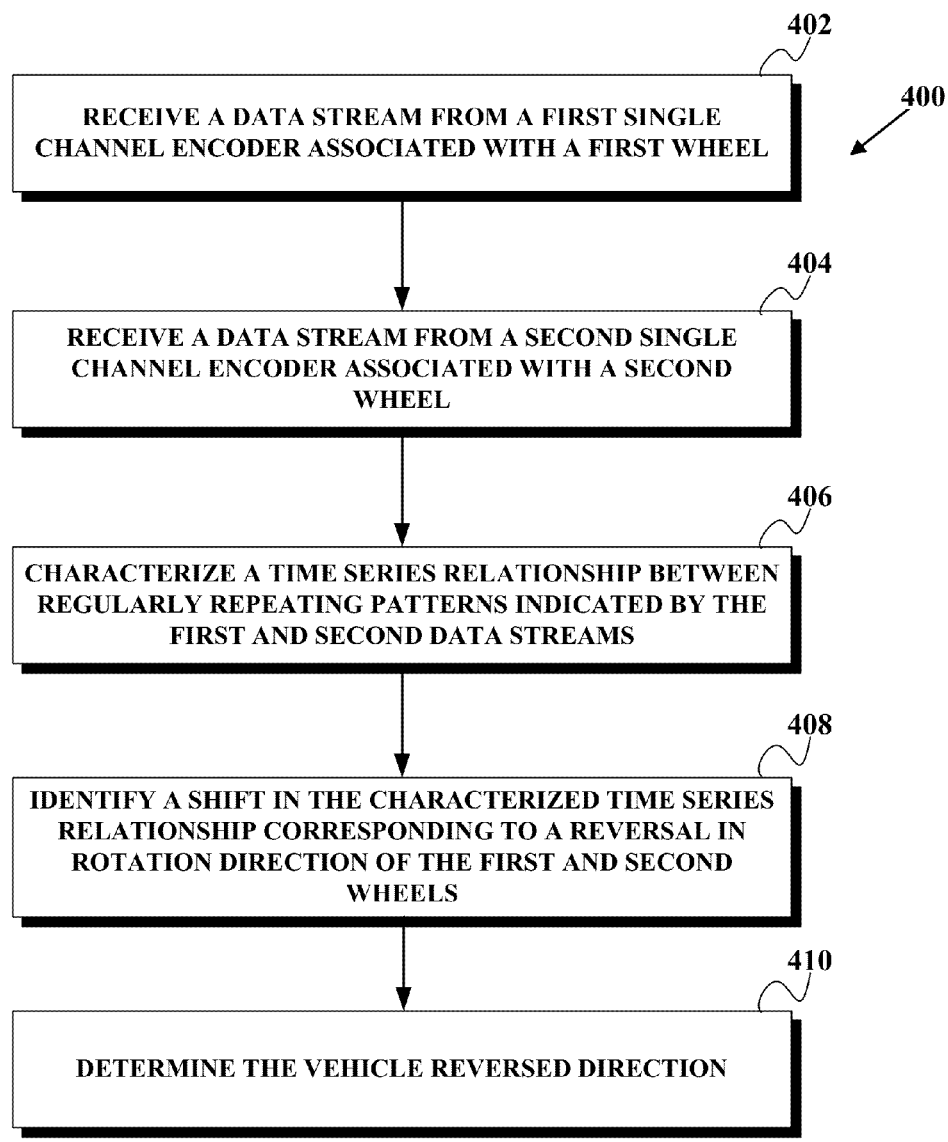
FIG. 4 is a flowchart of a process for determining a change in direction of an autonomous vehicle based on single channel encoder output signals.

FIG. 4 is a flowchart of a process 400 for determining a change in direction of an autonomous vehicle based on single channel encoder output signals. A first data stream is received from a first single channel encoder associated with a first wheel (402). The first single channel encoder can be, for example, the single channel encoder 324 on the rear passenger-side wheel 314 of the vehicle 300. The first data stream can be indicative of a regularly repeating pattern with a frequency based on the rotation rate of the first wheel. For example, the first single channel encoder can be configured to output a square wave pulse series with 100 pulses per complete rotation of the first wheel. Of course, the first single channel encoder can be configured to provide a different number of pulses per complete rotation, such as 50, 75, 120, etc. In some embodiments, the pulses are produced in response to axially symmetrically distributed features on the first wheel passing the first single channel encoder, such as where 120 pulses per rotation is achieved by features on the wheel spaced at every 3 degrees around the wheel.

A second data stream is received from a second single channel encoder associated with a second wheel (404). The second single channel encoder can be, for example, the single channel encoder 326 on the rear driver-side wheel 316 of the vehicle 300. The second data stream can be indicative of a regularly repeating pattern with a frequency based on the rotation rate of the second wheel (e.g., a square wave pulse series with 100 pulses per rotation of the second wheel).

The data streams are analyzed by a processor (such as a processor included in the controller 330 of the vehicle 300 or the computing system 112 of the vehicle 100). A time series relationship between the regularly repeating patterns indicated by the first and second data streams is characterized (406). An example of a time series of events characterizing a relationship between two regularly repeating patterns is described in connection with the example pulse outputs shown in the timing diagram of FIG. 5. For example, where the single channel encoders output a series of square pulses with roughly 50% duty cycle (i.e., the pulses are high roughly as long as they are low), the pulse series can be characterized according to the relative ordering of each pulse up and pulse down event. That is, the relative order of the following four events can characterize the time series relationship between the single channel encoder outputs: first encoder output up; first encoder output down; second encoder output up; second encoder output down. Further examples of relative orderings of pulse series events are described in connection with the timing diagrams at FIGS. 5-6.

The relative ordering of pulse series events can change due to wheel slippage (e.g., due to temporary loss of traction on loose surfaces, etc.) due to change of direction of the vehicle (e.g., due to the vehicle traveling around a corner), due to a change in circumference of the wheel, due to unequal path length traversed by the wheels (wheels positioned at different distances from the center of curvature of the vehicle when turning, or when one wheel goes over a bump while the other is traveling on flat ground). However, over short distances, the relative ordering of pulse series events between any given pair of wheels is maintained so long as the wheels do not experience slippage with respect to their respective tractive surfaces. Furthermore, where the wheels and/or tires do not experience a loss of traction, a reversal in direction of the vehicle results in a reversal in the relative ordering of pulse series events is reversed, because the features on the wheels (e.g., 312-318) pass the encoders (e.g., 322-328) in the reverse direction. For example, an initial time series relationship between single channel encoder pulse series events from two wheels can be as follows: first encoder output up; second encoder output down; first encoder output down; second encoder output up. Assuming no wheel slippage or difference in the number of pulses per linear distance traveled, following a reversal in direction of the wheels the pulse series events will be: second encoder output up; first encoder output down; second encoder output down; first encoder output up. Thus, a reversal in the relative ordering of pulse series events from two wheels can be identified as a shift in the initially characterized time series relationship corresponding to a reversal in rotation direction of the wheels (408).

In some embodiments, the relative time relationship between the two regularly repeating patterns indicated by single channel encoders on different wheels can be expressed as a phase delay between the two. That is, the output of the first single channel encoder can be expressed as a first function of time $F_1(t)$ and the output of the second single channel encoder can be expressed as a second function of time $F_2(t)$.

Further, $F_1(t)$ and $F_2(t)$ can be related as follows: $F_2(t)=F_1(t+\phi)$, where $\phi$ is the relative phase delay between the two regularly repeating patterns. A reversal in direction of the wheels results in a sign change of the relative phase delay between the two regularly repeating patterns. For example, following a reversal in rotation direction, the output of the second single channel encoder can be expressed as $F_2(t)=F_1(t-\phi)$. Thus, a change in sign in the phase delay between the regularly repeating patterns indicated by the two single channel encoder outputs can be identified as a shift in the initially characterized time series relationship corresponding to a reversal in rotation direction of the wheels (408).

Upon identifying a shift in the initially characterized time series relationship corresponding to a reversal in rotation direction of the wheels (408), the vehicle is determined to have reversed direction (410). Some embodiments of the present disclosure provide for combining multiple single channel encoder outputs to monitor both speed and direction of the vehicle over time. The speed and direction information can be used to estimate a displacement of the vehicle from an initial position and thereby inform an estimation of vehicle position.

FIG. 4 presents a flowchart describing processes employed separately or in combination in some embodiments of the present disclosure. The methods and processes described herein are generally described by way of example as being carried out by an autonomous vehicle, such as the autonomous vehicles 100, 200, 300 described above in connection with FIGS. 1-3. For example, the processes described herein can be carried out by the computer system 112 and/or sensor fusion algorithm module 138 in communication with single channel encoders arranged as wheel speed sensors.

Furthermore, it is noted that the functionality described in connection with the flowcharts described herein can be implemented as special-function and/or configured general-function hardware modules, portions of program code executed by a processor (e.g., the processor 113 in the computer system 112) for achieving specific logical functions, determinations, and/or steps described in connection with the flowcharts. Where used, program code can be stored on any type of computer readable medium (e.g., computer readable storage medium or non-transitory media, such as data storage 114 described above with respect to computer system 112), for example, such as a storage device including a disk or hard drive. In addition, each block of the flowcharts can represent circuitry that is wired to perform the specific logical functions in the process. Unless specifically indicated, functions in the flowcharts can be executed out of order from that shown or discussed, including substantially concurrent execution of separately described functions, or even in reverse order in some examples, depending on the functionality involved, so long as the overall functionality of the described method is maintained. Furthermore, similar combinations of hardware and/or software elements can be employed to implement the methods described in connection with other flowcharts provided in the present disclosure.

Figure 5:
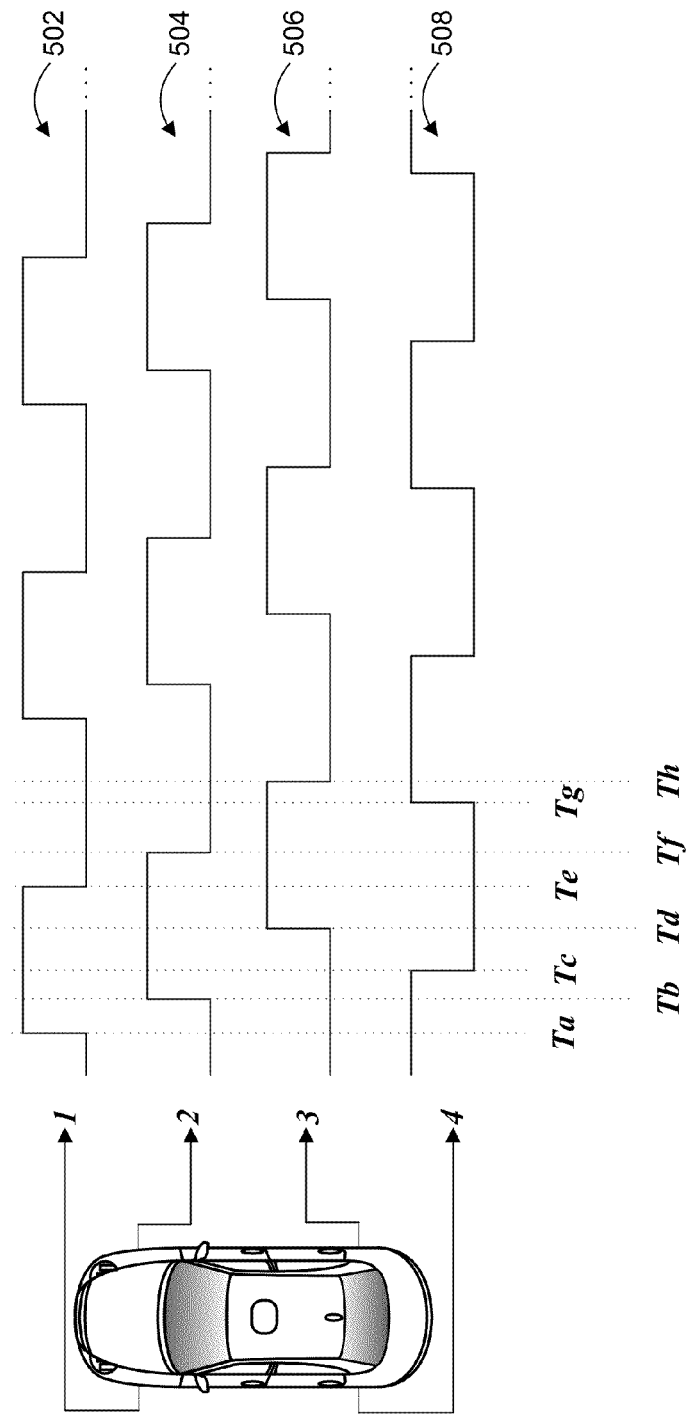
FIG. 5 is a timing diagram of example outputs from single channel encoders on each wheel of an autonomous vehicle.

FIG. 5 is a timing diagram of example outputs from single channel encoders on each wheel of an autonomous vehicle. The encoders are identified by their locations (1, 2, 3, and 4) in the vehicle. In the example outputs shown in FIG. 5, the pulse outputs are shown as square wave pulses, however, it is noted that some embodiments can include single channel encoders outputting alternative regularly repeating patterns (including sine wave, triangle wave, etc.) with frequencies indicative of wheel rotation rates. A first pulse series output 502 represents the output from a front driver-side wheel. A second pulse series output 504 represents the output from a front passenger-side wheel. A third pulse series output 506 represents the output from a rear passenger-side wheel. A fourth pulse series output 508 represents the output from a rear driver-side wheel. While the vehicle rolls forward in a roughly straight line, the outputs from the four single channel encoders are ordered as shown in the table below.

| Event No. | Time | Event |
| --- | --- | --- |
| 1 | Ta | Encoder 1 output goes high |
| 2 | Tb | Encoder 2 output goes high |
| 3 | Tc | Encoder 4 output goes low |
| 4 | Td | Encoder 3 output goes high |
| 5 | Te | Encoder 1 output goes low |
| 6 | Tf | Encoder 2 output goes low |
| 7 | Tg | Encoder 4 output goes high |
| 8 | Th | Encoder 3 output goes low |

In some embodiments of the present disclosure, the time ordering of the events listed in the table are used to characterize the relationship between the four single channel encoder outputs while the vehicle moves in a first direction (e.g., forward). The order of the events (e.g., encoder outputs high or low) can be indicated by the times Ta-Th, which can indicate the time of each event relative to an on-board clock, for example. The times Ta-Th can be a monotonically increasing series so as to indicate the relative ordering of the events listed in the table. In other words, some embodiments can utilize only the order of the pulse series events, indicated in the first column of the above table, and not the time information, indicated in the second column of the above table.

Upon reversal of direction of the vehicle, the order of these events is reversed, because the features on the wheels activating the single channel encoders pass the encoders in the reverse direction. Assuming no slippage of any of the wheels, the relative order of the 8 events listed in the table above is reversed. That is, upon reversal of the direction of the vehicle, the order of events in the four separate pulse trains becomes:

| Event No. | Event |
| --- | --- |
| 1 | Encoder 3 output goes low |
| 2 | Encoder 4 output goes high |
| 3 | Encoder 2 output goes low |
| 4 | Encoder 1 output goes low |
| 5 | Encoder 3 output goes high |
| 6 | Encoder 4 output goes low |
| 7 | Encoder 2 output goes high |
| 8 | Encoder 1 output goes high |

The four wheels shown in the timing diagram of FIG. 5 can be divided into six unique pairs of single channel encoders: 1 with 2, 1 with 3, 1 with 4, 2 with 3, 2 with 4, and 3 with 4. Each of the independent pairs of encoders can be characterized according to an order and/or phase offset between pulse series events to provide sensitivity to direction changes of the vehicle. Thus, any of the six independent pairs of encoders can be combined to detect changes in direction. That is, a reversal in relative ordering of pulse train events between any of the six independent pairs of encoders can indicate a reversal in direction. Further, using information from more than one pair of encoders in the six independent pairs of encoders can beneficially provide redundant information. The redundant information can allow for detecting a direction change event even where two of the encoder pulse trains happen to be precisely temporally aligned (e.g., both rise to a high level and fall to a low level at the exact same times, or times sufficiently close so as to be indistinguishable) such that the relative ordering of events cannot be determined.

The redundancy of the direction change technique can also allow for detecting changes in direction even when one of the wheels loses traction. For example, if the first wheel/tire temporarily loses traction, the relative order of pulse series events between pairs of encoders including the first encoder are randomly redistributed, and no information is provided from the three pairs of encoders including the first encoder: 1 with 2, 1 with 3, and 1 with 4. However, assuming no loss of traction on the second, third, and fourth wheels/tires, the remaining independent pairs of encoders (2 with 3, 2 with 4, and/or 3 with 4) can still allow for detection of a change in direction.

In addition, by combining information from encoders on four different tires, the spatial sensitivity of the position and/or direction estimation technique is increased by approximately a factor of four in comparison to monitoring only one encoder output. That is, the combination of four sensor outputs provides approximately four times as many pulse series events (e.g., pulse increase to high and/or pulse decrease to low) for a given distance traveled by the vehicle in comparison with one sensor output. Thus, in comparison with a system that monitors a dual channel encoder output from a single wheel to detect direction changes, direction changes can be detected with relatively greater spatial precision by combining the outputs from single channel encoders on four wheels. Similarly, the greater number of pulse series events per distance traveled affords greater precision in estimating the instantaneous speed of the vehicle, because estimations can be made based on data collected over a shorter traveled distance of the vehicle.

In some embodiments of the present disclosure, wheel sensors output regularly repeating patterns with frequencies dependent on wheel rotation rate other than a square-wave pattern, such as a sinusoidal-wave pattern, a triangle-wave pattern, etc. In contrast to square-wave pulse outputs, some sensor outputs (e.g., sinusoidal-waves, triangle-waves, etc.) can include a time-changing voltage that oscillates between increasing in time (i.e., positive time derivative) and decreasing in time (i.e., negative time derivative). In such an example, a change in vehicle direction can be detected by identifying a change from increasing to decreasing (or decreasing to increasing) on any one wheel sensor before reaching the maximum (or minimum) value of the regularly repeating pattern. For example, where a sinusoidal output signal from one wheel abruptly goes from increasing to decreasing before reaching an expected maximum value, the point where the signal changes from increasing to decreasing can be identified as a change in direction of the vehicle. Similarly, signals that abruptly change from decreasing to increasing before reaching an expected minimum value indicate a change in vehicle direction at the point where the signal changes from decreasing to increasing. However, where a change in direction of the vehicle coincides with the sensor output signal being at or near the maximum or minimum value of its regularly repeating pattern (e.g., maximum or minimum value of sinusoidal-wave, triangle-wave, etc.) the change in direction when the wheel rotates in the reverse direction can be indistinguishable from the wheel continuing in the same direction. For example, where the regularly repeating pattern is symmetric with respect to its respective maximum and minimum output points, such as in a sine wave, a change in direction that coincides with an output signal at its maximum or minimum value can be indistinguishable from the wheel briefly stopping and continuing in the same direction. Monitoring multiple such sensor outputs from multiple wheels allows for resolving such potential ambiguity, because it is unlikely for multiple sensor outputs to be aligned such that all sensors will simultaneously be at or near a maximum or minimum value during a change in vehicle direction. Combining the sensor outputs from multiple wheel sensors thereby allows for identifying changes in vehicle direction that would otherwise be ambiguous.

Moreover, some embodiments of the present disclosure provide for estimating a vehicle's speed by combining information from wheel speed sensors on either side of the vehicle to estimate speed of the center of the vehicle. For example, the speed estimates (e.g., frequency measurements) from sensors on the driver side and passenger side of the vehicle can be averaged to estimate the speed of the vehicle at the center of the axle. Such a technique is useful to estimate vehicle speed even while the vehicle is turning. For example, while the vehicle is turning the left side of the vehicle traverses a greater or lesser arc path than the right side of the vehicle. As a result, during turning, speed estimations derived from a wheel speed sensor on one side of the vehicle can be different from a speed estimation derived from a wheel speed sensor on the other side of the vehicle. Combining two (or more) sensor outputs from both passenger and driver sides of the vehicle allows for estimating the speed of the vehicle along a center line traveled by the vehicle.

To illustrate the ability to characterize a direction of an autonomous vehicle according to a time series relationship between encoder outputs from any two wheels, FIGS. 6A-6E provide example encoder outputs from a pair of encoder outputs. While the encoder outputs are each labeled as 1 and 2, it is understood that the two outputs can from any of the six independent pairs of encoders. For example, the two outputs can be from encoders on the two rear wheels (e.g., 324, 326), encoders on the two front wheels (e.g., 322, 328), etc. Moreover, it is understood that some embodiments of the present disclosure can use more than one of the independent pairs of encoders in combination to characterize a direction of motion of an autonomous vehicle and/or detect a change in direction of motion of the autonomous vehicle.

Figure 6A:
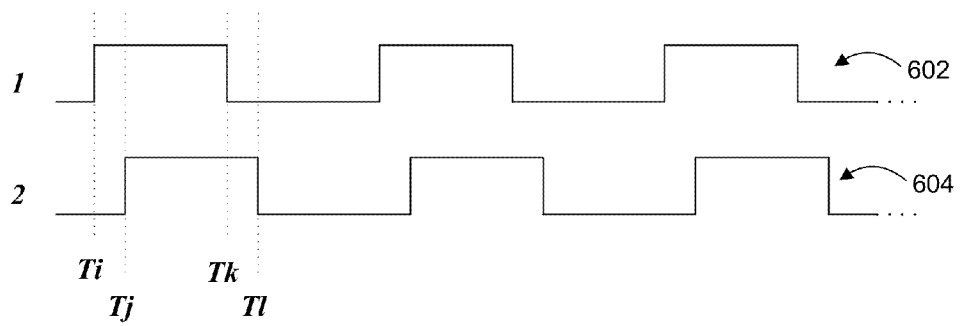
FIG. 6A is a timing diagram of single channel encoder outputs from two wheels while the autonomous vehicle travels in a first direction.

FIG. 6A is a timing diagram of single channel encoder outputs from two wheels while the autonomous vehicle travels in a first direction. An example first pulse series output 602 is a regularly repeating pattern of square pulses. An example second pulse series output 604 is a regularly repeating pattern of square pulses that is offset from the first pattern. The relative order of the pulse series events is shown in the table below. The relative order of these events is given in the table below and can be recorded (e.g., by the controller 330 of the vehicle 300) for use in identifying a subsequent shift in the pulse series events.

| Event No. | Time | Event |
| --- | --- | --- |
| 1 | Ti | Encoder 1 output goes high |
| 2 | Tj | Encoder 2 output goes high |
| 3 | Tk | Encoder 1 output goes low |
| 4 | Tl | Encoder 2 output goes low |

In some embodiments, the pulse series event order can be characterized according to a phase offset between the first and second pulse series outputs. That is the phase offset corresponding to the time delay between similar events (e.g., pulse goes high) can characterize the time series relationship between the encoder outputs. For example, the time series relationship in FIG. 6A can be characterized by $\phi=Tj-Ti$, and the second encoder output, $S_2$ (e.g., 604) can be written in terms of the first encoder output $S_1$ (e.g., 602) as $S_2(t)=S_1(t+\phi)$.

Figure 6B:
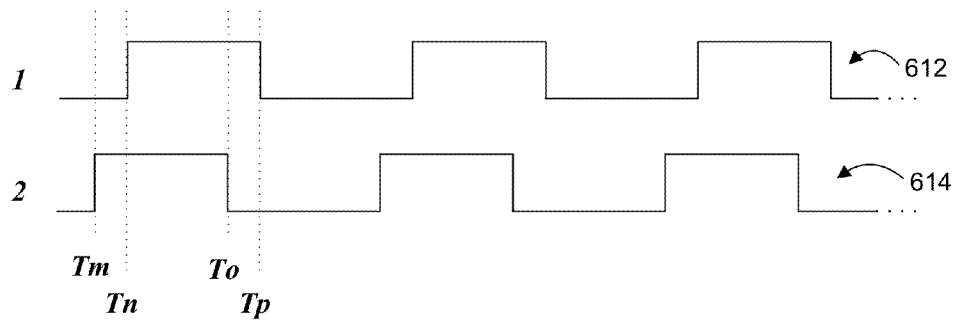
FIG. 6B is a timing diagram of single channel encoder outputs from two wheels while the autonomous vehicle travels in a direction opposite the direction shown in FIG. 6A.

FIG. 6B is a timing diagram of single channel encoder outputs from two wheels while the autonomous vehicle travels in a direction opposite the direction shown in FIG. 6A. Assuming no slippage between the two wheels/tires providing the pulse outputs in FIG. 6A, the relative ordering of the pulse series events is the reverse of that shown in FIG. 6A. An example first pulse series output 612 is a regularly repeating pattern of square pulses. An example second pulse series output 614 is a regularly repeating pattern of square pulses that is offset from the first pattern. The relative order of these events is opposite the order in FIG. 6A, as shown in the table below:

| Event No. | Time | Event |
|---|---|---|
| 1 | Tm | Encoder 2 output goes high |
| 2 | Tn | Encoder 1 output goes high |
| 3 | To | Encoder 2 output goes low |
| 4 | Tp | Encoder 1 output goes low |

In some embodiments, the pulse series event order shown in FIG. 6B can be characterized according to a phase offset between the first and second pulse series outputs. That is the phase offset corresponding to the time delay between similar events (e.g., pulse goes high) can characterize the time series relationship between the encoder outputs. For example, the time series relationship in FIG. 6B can be characterized by $Tn-Tm=-\phi$. Thus, the phase offset characterizing the time series relationship of the encoder outputs in FIG. 6B is negative the phase offset characterizing the time series relationship of the encoder outputs in FIG. 6A.

Figure 6C:
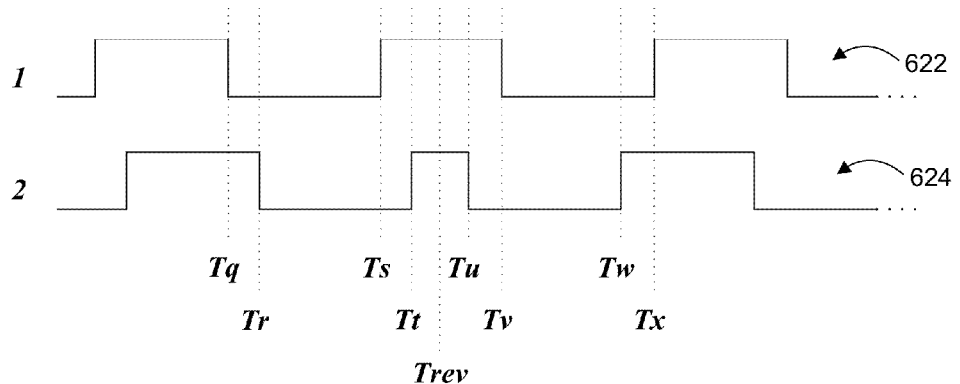
FIG. 6C is a timing diagram of single channel encoder outputs from two wheels while the autonomous vehicle slows to a stop and continues moving in the opposite direction.

FIG. 6C is a timing diagram of single channel encoder outputs from two wheels while the autonomous vehicle slows to a stop and continues moving in the opposite direction. An example first pulse series output 622 is a regularly repeating pattern of square pulses. An example second pulse series output 624 is a regularly repeating pattern of square pulses that is offset from the first pattern. Prior to the reversal in direction (at time Trev), in the time period Tq-Tt, the time series relationship initially has an event order given by the table below:

| Event No. | Time | Event |
|---|---|---|
| 1 | Tq | Encoder 1 output goes low |
| 2 | Tr | Encoder 2 output goes low |
| 3 | Ts | Encoder 1 output goes high |
| 4 | Tt | Encoder 2 output goes high |

Following a reversal in direction at time Trev, in the time period Tu-Tx, the time series relationship has an event order given by the table below:

| Event No. | Time | Event |
|---|---|---|
| 1 | Tu | Encoder 2 output goes low |
| 2 | Tv | Encoder 1 output goes low |
| 3 | Tw | Encoder 2 output goes high |
| 4 | Tx | Encoder 1 output goes high |

The time Tq-Tt can be a characterization time window to calibration the time series relationship of the two encoder outputs. The time Tu-Tx can be a time window to identify the reversal in time series relationship.

Upon determining the vehicle reversed direction, the controller 330 and/or computing system 112 can be configured to estimate the time of direction reversal Trev. For example, the reversal time Trev can be estimated as the mid-point between nearest corresponding time series events from common encoder outputs on either side of the direction reversal. For example, the time Trev can be estimated as the mid-point between the times Tt and Tu where encoder 2 goes high before direction reversal (at time Tt) and then goes low after direction reversal (at time Tu), before the occurrence of any intervening pulse series events. In some examples, the occurrence of a single encoder going high then low (or low then high) where no other time series events take place in between can itself indicate a direction reversal. For example, in FIG. 6C, the second encoder goes high at time Tt, then goes low at time Tu, and no pulse series events occur on the first encoder output in the period Tt-Tu.

Figure 6D:
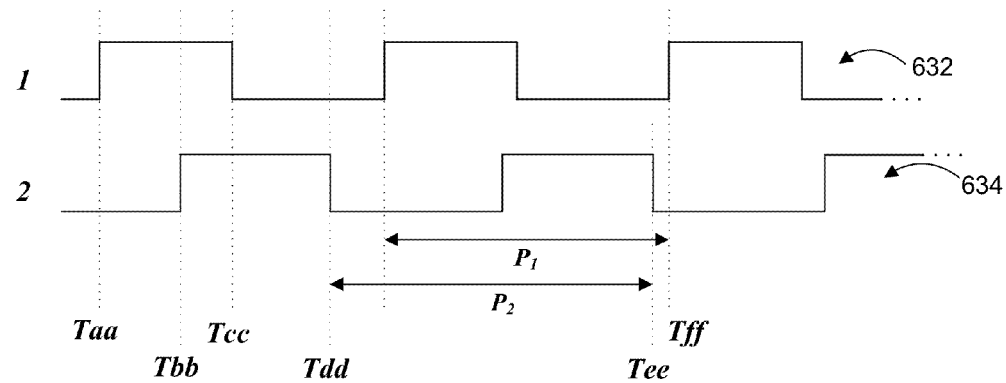
FIG. 6D is a timing diagram of single channel encoder outputs from two wheels with different output frequencies while the autonomous vehicle travels in a first direction.

FIG. 6D is a timing diagram of single channel encoder outputs from two wheels with different output frequencies while the autonomous vehicle travels in a first direction. An example first pulse series output 632 is a regularly repeating pattern of square pulses. An example second pulse series output 634 is a regularly repeating pattern of square pulses that is offset from the first pattern and has a lower frequency than the first pattern. While the vehicle travels at an approximately constant rate, the first pulse series output 632 has a period $P_1$ given by, for example, the time between successive common pulse series events (e.g., output increases to high from low or decreases to low from high). The second pulse series output 634 has a period $P_2$ that is different from $P_1$. As shown in the example illustrated in FIG. 6D, the period $P_2$ is greater than the period $P_1$. The difference in the periods (and frequencies) of the respective regularly repeating patterns from each sensor can be due to, for example, differences in the circumferences of the two tires, that cause the second tire to have a larger circumference (and so turn less often for a given straight line displacement of the vehicle) than the first tire. Such differences in circumference can be due to, for example, differences in tire size, differences in tread wear, differences in inflation amount, etc.

As a result in the differences in period, the phase offset relating the regularly repeating patterns from the two encoder outputs gradually changes over time. The initial relative order of the pulse series events is shown in the table below. The relative order of these events is given in the table below

| Event No. | Time | Event |
|---|---|---|
| 1 | Taa | Encoder 1 output goes high |
| 2 | Tbb | Encoder 2 output goes high |
| 3 | Tcc | Encoder 1 output goes low |
| 4 | Tdd | Encoder 2 output goes low |

Due to the differences in periods between the first and second outputs, the relative ordering changes at time Tee and Tff, when the second output goes low (at time Tee) before the first output goes high (at time Tee). However, the relative phase between the regularly repeating patterns pulse due to differences in wheel circumference is predictable and calculable. For example, the ratio of encoder pulse outputs from two tires over a long period can be accurately measured and used to identify variations from the expected straight line behavior. Characterizing the straight line behavior can also be carried out by characterizing a time-variant behavior of the phase offset relating the two output signals. For example, the phase offset can be characterized as itself varying in time with a period given at least approximately by the inverse of the difference in periods of the two regularly repeating pattern (e.g., $S_1(t)=S_2(t+\phi(t))$, where $\phi(t) \approx \sin(t/(|P_1-P_2|)+\delta))$. Over the course of straight-line distance traveled the system can create a mathematical relationship between one or more of the regularly repeating patterns from the wheel sensors (e.g., the encoders 322-328). The system (e.g., the controller 330) can characterize the relative phase(s) between the regularly repeating patterns including time-varying aspects of the relative phase(s) such that the relationship between encoder outputs is predictable and calculable. Once characterized, the dynamic relationship between pulse trains can then be used to determine changes in vehicle direction and/or bearing, such as wheel reversal and/or turning.

While the example timing diagram shown in FIG. 6D is described in connection with a vehicle traveling in a substantially straight line where the first tire has a smaller circumference than the second tire, it is noted that a similar output can result from two tires with substantially identical circumference and/or inflation while the vehicle traveling along a curve such that the first tire travels a greater distance than the second tire. Moreover, some embodiments of the present disclosure include detecting outputs from single channel encoders on multiple wheels where differences in the output repeating patterns are due to both differences in circumference of the tires as well as changes in direction of the vehicle, combinations of these, etc. However, the difference in frequency between encoder outputs can be precisely characterized while the vehicle is moving in a substantially straight line and the system can be set to identify variations from the straight line behavior. Thus, by characterizing the expected pattern(s) of encoder outputs from multiple wheels, variations from the expected pattern(s) can be detected, and associated with changes in direction and/or bearing of the vehicle.

Figure 6E:
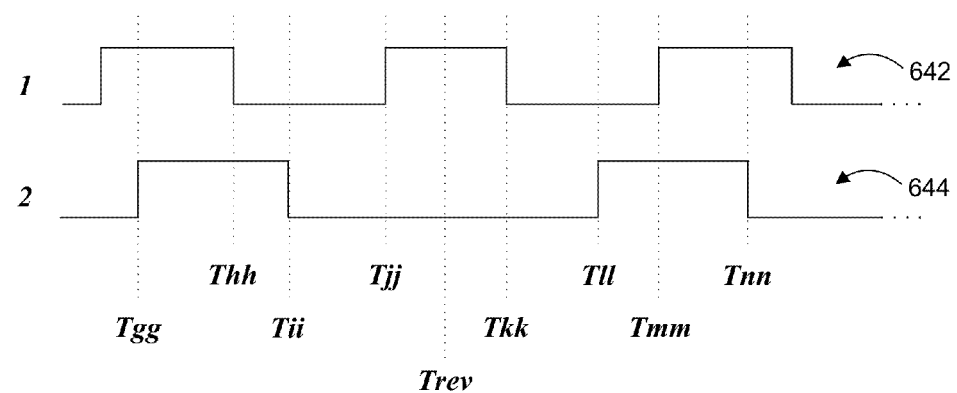
FIG. 6E is a timing diagram of single channel encoder outputs from two wheels with different output frequencies while the autonomous vehicle slows to a stop and continues moving in the opposite direction.

FIG. 6E is a timing diagram of single channel encoder outputs from two wheels with different output frequencies while the autonomous vehicle slows to a stop and continues moving in the opposite direction. Similar to the reverse direction scheme discussed above in connection with FIG. 6C, changing direction is indicated by a sign change in the relative phase offset between the two regularly repeating patterns and/or by a reversal of order of pulse series events. An example first pulse series output 642 is a regularly repeating pattern of square pulses. An example second pulse series output 644 is a regularly repeating pattern of square pulses that is offset from the first pattern and has a lower frequency than the first pattern. Immediately prior to the reversal in direction (at time Trev), in the time period Tgg-Tjj, the time series relationship initially has an event order given by the table below:

| Event No. | Time | Event |
|---|---|---|
| 1 | Tgg | Encoder 2 output goes high |
| 2 | Thh | Encoder 1 output goes low |
| 3 | Tii | Encoder 2 output goes low |
| 4 | Tjj | Encoder 1 output goes high |

Following a reversal in direction at time Trev, in the time period Tkk-Tnn, the time series relationship has an event order given by the table below:

| Event No. | Time | Event |
|---|---|---|
| 1 | Tkk | Encoder 1 output goes low |
| 2 | Tll | Encoder 2 output goes low |
| 3 | Tmm | Encoder 1 output goes high |
| 4 | Tnn | Encoder 2 output goes low |

The time Tgg-Tjj can be a characterization time window to calibration the time series relationship of the two encoder outputs. The time Tkk-Tnn can be a time window to identify the reversal in time series relationship.

Upon determining the vehicle reversed direction, the controller 330 and/or computing system 112 can be configured to estimate the time of direction reversal Trev. For example, the reversal time Trev can be estimated as the mid-point between nearest corresponding time series events from common encoder outputs on either side of the direction reversal. For example, the time Trev can be estimated as the mid-point between the times Tjj and Tkk where encoder 1 goes high before direction reversal (at time Tjj) and then goes low after direction reversal (at time Tkk), before the occurrence of any intervening pulse series events. In some examples, the occurrence of a single encoder going high then low (or low then high) where no other time series events take place in between can itself indicate a direction reversal. In some embodiments, the direction reversal can be identified according to the timing of a sign change in the phase offset relating the two regularly repeating patterns from the encoder outputs.

To account for the potential for slippage among any of the wheels/tires on the autonomous vehicle, some embodiments of the present disclosure provide for repetitively characterizing the time series relationship between encoder outputs. The characterization process can be considered a calibration of the technique for detecting changes in vehicle direction. Each calibration process can be considered to establish the relative ordering over a set time period and/or distance of travel of the vehicle. For example, the relative time series relationship can be recharacterized ("recalibrated") at each second (or 0.5 seconds, 2 seconds, 10 seconds, etc.), following each complete rotation of one of the wheels (or half rotation, 2 rotations, etc.), following movement of the vehicle by one meter (or 1 foot, 2 meters, etc.). Each characterization ("calibration") is then used to detect changes in direction over a short duration until updated by a subsequent characterization. The straightness of the vehicle travel must be known (or at least known to be straight) during the calibration process. Other sensors can be used to inform this determination (steering input, GPS, Gyroscope, etc.). If the calibration constant from one calibration cycle to the next changes beyond a determined threshold then the new calibration can be assumed invalid and the re-calibration event can be repeated at a later time.

In some embodiments, the repetitive characterization/calibration process is initiated in response to the vehicle traveling below a threshold rate of speed and/or rate of rotation of the wheels/tires, where the vehicle is more likely to come to a stop and/or change direction.

Some embodiments of the present disclosure provide for estimating changes in direction based on outputs from more than one single channel encoder wheel speed sensor. The direction information can then be employed to estimate a displacement of the vehicle based on the speed of the vehicle, which can be inferred by the frequency of the encoder outputs and/or another component in the sensor system 104 of the vehicle 100. Furthermore, the present disclosure can be combined with information from one or more additional inputs to determine the initial direction of the vehicle (e.g., forward or backward) so that the subsequently detected change(s) in direction can similarly be associated with a direction of the vehicle (e.g., backward or forward). Some embodiments of the present disclosure provide for the controller 330 and/or computer system 112 to receive inputs from components in the sensor system 104 and/or information from the sensor fusion algorithm 138 and/or computer vision system 140 to determine the initial direction of the vehicle. For example, information from the GPS 122, IMU 124, RADAR 126, LIDAR 128, and/or camera 130 can be analyzed to indicate the vehicle is moving forward (or backward) based on GPS signals and/or relative motion of background fixed objects, such as buildings, trees, etc. Further, information can be provided to indicate a setting of the transmission 120 (e.g., drive, reverse, etc.) to provide an indication of direction of vehicle motion. In some examples, where the vehicle is in reverse during the calibration characterization, the initial direction of motion can be assumed to be backward, and similarly where the vehicle is in a forward-moving gear during the calibration characterization, the initial direction can be assumed to be forward.

Figure 7:
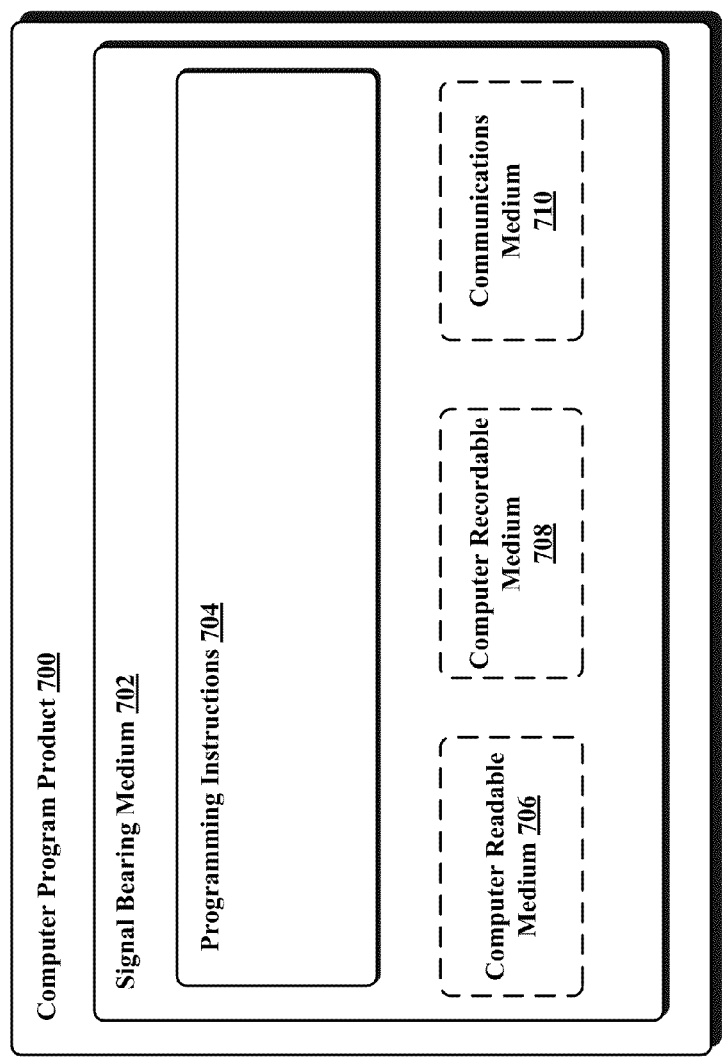
FIG. 7 depicts a computer-readable medium configured according to an example embodiment.

FIG. 7 depicts a computer-readable medium configured according to an example embodiment. In example embodiments, the example system can include one or more processors, one or more forms of memory, one or more input devices/interfaces, one or more output devices/interfaces, and machine-readable instructions that when executed by the one or more processors cause the system to carry out the various functions, tasks, capabilities, etc., described above.

As noted above, in some embodiments, the disclosed techniques can be implemented by computer program instructions encoded on a non-transitory computer-readable storage media in a machine-readable format, or on other non-transitory media or articles of manufacture (e.g., the instructions 115 stored on the data storage 114 of the computer system 112 of vehicle 100). FIG. 7 is a schematic illustrating a conceptual partial view of an example computer program product that includes a computer program for executing a computer process on a computing device, arranged according to at least some embodiments presented herein.

In one embodiment, the example computer program product 700 is provided using a signal bearing medium 702. The signal bearing medium 702 may include one or more programming instructions 704 that, when executed by one or more processors may provide functionality or portions of the functionality described above with respect to FIGS. 1-6. In some examples, the signal bearing medium 702 can be a computer-readable medium 706, such as, but not limited to, a hard disk drive, a Compact Disc (CD), a Digital Video Disk (DVD), a digital tape, memory, etc. In some implementations, the signal bearing medium 702 can be a computer recordable medium 708, such as, but not limited to, memory, read/write (R/W) CDs, R/W DVDs, etc. In some implementations, the signal bearing medium 702 can be a communications medium 710, such as, but not limited to, a digital and/or an analog communication medium (e.g., a fiber optic cable, a waveguide, a wired communications link, a wireless communication link, etc.). Thus, for example, the signal bearing medium 702 can be conveyed by a wireless form of the communications medium 710.

The one or more programming instructions 704 can be, for example, computer executable and/or logic implemented instructions. In some examples, a computing device such as the computer system 112 of FIG. 1 is configured to provide various operations, functions, or actions in response to the programming instructions 704 conveyed to the computer system 112 by one or more of the computer readable medium 706, the computer recordable medium 708, and/or the communications medium 710.

The non-transitory computer readable medium 706 can also be distributed among multiple data storage elements, which could be remotely located from each other. The computing device that executes some or all of the stored instructions could be a vehicle, such as the vehicle 200 illustrated in FIG. 2, the vehicle 300 illustrated in FIG. 3, etc. Alternatively, the computing device that executes some or all of the stored instructions could be another computing device, such as a server.

While various example aspects and example embodiments have been disclosed herein, other aspects and embodiments will be apparent to those skilled in the art. The various example aspects and example embodiments disclosed herein are for purposes of illustration and are not intended to be limiting, with the true scope and spirit being indicated by the following claims.

What is claimed is:

1. A method comprising:
   determining a low speed condition based on a decreasing velocity of a vehicle;
   in response to the low speed condition, receiving, by a computing system, a first data stream from a first single channel encoder associated with a first wheel of the vehicle, the first data stream indicative of a first regularly repeating pattern with a frequency based on a rate of rotation of the first wheel;
   receiving, by the computing system, a second data stream from a second single channel encoder associated with a second wheel of the vehicle, the second data stream indicative of a second regularly repeating pattern with a frequency based on a rate of rotation of the second wheel;
   characterizing a time series relationship between the first and second regularly repeating patterns during a first time window corresponding to motion of the vehicle in a first direction;
   during a second time window following the first time window, identifying a shift in the characterized time series relationship corresponding to a reversal in rotation direction of the first and second wheels;
   responsive to identifying the shift, determining the vehicle is moving in a second direction substantially opposite the first direction; and
   determining a time of direction reversal of the vehicle based on a timing of the identified shift.

2. The method according to claim 1, further comprising:
   determining a speed of the vehicle prior to the determined time of direction reversal and a speed of the vehicle after the determined time of direction reversal, based in part on the frequencies of the first and second regularly repeating patterns indicative of the rates of rotation of the first and second wheels, respectively; and
   determining a net displacement of the vehicle during a period that includes the determined time of reversal based on the determined speed of the vehicle while moving in the first direction, prior to the determined time of reversal, and based on the determined speed of the vehicle while moving in the second direction, following the determined time of reversal.

3. The method according to claim 2, further comprising:
   estimating a position of the vehicle based on the determined net displacement;
   identifying obstacles with the vehicle based on the estimated position;

determining a modified path of the vehicle that avoids the identified obstacles; and controlling the vehicle to navigate along the modified path.

4. The method according to claim 1, wherein the characterizing the time series relationship includes determining a relative phase offset between the first and second regularly repeating patterns, and wherein the identified shift in the characterized time series relationship includes a change in sign of the relative phase offset.

5. The method according to claim 1, further comprising:

comparing the frequencies of the first and second regularly repeating patterns during the second window to identify a differential rate of rotation between the first and second wheels; and predicting a bearing of the vehicle during the second time window based on the identified differential rate of rotation.

6. The method according to claim 1, wherein the first and second data streams are each indicative of a series of pulses with a fixed number of pulses for each complete rotation of the first and second wheel, respectively.

7. The method according to claim 1, further comprising:

receiving one or more additional data streams from one or more additional single channel encoders associated with one or more additional wheels of the vehicle, wherein the one or more additional data streams are indicative of one or more additional regularly repeating patterns with frequencies based on respective rates of rotation of the one or more additional wheels of the vehicle;

characterizing time series relationships among the one or more additional regularly repeating patterns and the first and second regularly repeating patterns; and wherein determining the vehicle is moving in the second direction includes analyzing the additional regularly repeating patterns and the first and second regularly repeating patterns during the second time window to identify shifts in one or more of the characterized time series relationships corresponding to a reversal in rotation direction of the first wheel, the second wheel, and the one or more additional wheels.

8. The method according to claim 1, further comprising:

responsive to the frequency of the first and second regularly repeating patterns indicating a vehicle speed below a threshold value, repetitively analyzing the first and second data streams to characterize the time series relationship between the first and second regularly repeating patterns such that the time series relationship is recharacterized at least once per rotation of the first wheel.

9. The method according to claim 1, wherein the orientation of the first direction is determined based on one or more sensors configured to detect a motion of the vehicle with respect to its surroundings.

10. An autonomous vehicle system comprising:

a first single channel encoder associated with a first wheel of the autonomous vehicle and configured to generate a data stream indicative of a regularly repeating pattern with a frequency based on a rate of rotation of the first wheel;

a second single channel encoder associated with a second wheel of the autonomous vehicle and configured to generate a data stream indicative of a regularly repeating pattern with a frequency based on a rate of rotation of the second wheel; and a controller configured to:

determine a low speed condition based on a decreasing velocity of the autonomous vehicle;

in response to the low speed condition, characterize a time series relationship between the first and second regularly repeating patterns during a first time window corresponding to motion of the vehicle in a first direction;

during a second time window following the first time window, identify a shift in the characterized time series relationship corresponding to a reversal in rotation direction of the first and second wheels;

responsive to identifying the shift in the characterized time series relationship, determine the vehicle is moving in a second direction substantially opposite the first direction; and determine a time of direction reversal of the autonomous vehicle based on a timing of the identified shift.

11. The autonomous vehicle system according to claim 10, wherein the controller is further configured to:

determine a speed of the vehicle prior to the determined time of direction reversal and a speed of the vehicle after the determined time of direction reversal, based in part on the frequencies of the first and second regularly repeating patterns indicative of the rates of rotation of the first and second wheels, respectively; and determine a net displacement of the vehicle during a period that includes the determined time of reversal based on the determined speed of the vehicle while moving in the first direction, prior to the determined time of reversal, and based on the determined speed of the vehicle while moving in the second direction, following the determined time of reversal.

12. The autonomous vehicle system according to claim 11, wherein the controller is further configured to:

estimate a position of the autonomous vehicle based on the determined net displacement;

identify obstacles with the vehicle based on the estimated position;

determine a modified path of the vehicle that avoids the identified obstacles; and control the vehicle to navigate along the modified path.

13. The autonomous vehicle system according to claim 10, wherein the controller is further configured to:

determine a relative phase offset between the first and second regularly repeating patterns; and identify the shift in the characterized time series relationship by identifying a change in sign of the relative phase offset.

14. The autonomous vehicle system according to claim 10, wherein the controller is further configured to:

compare the frequencies of the first and second regularly repeating patterns during the second window to identify a differential rate of rotation between the first and second wheels; and predict a bearing of the vehicle during the second time window based on the identified differential rate of rotation.

15. The autonomous vehicle system according to claim 10, further comprising:

one or more additional single channel encoders associated with one or more additional wheels of the autonomous vehicle and configured to generate one or more additional data streams indicative of one or more additional regularly repeating patterns with frequencies based on respective rates of rotation of the one or more additional wheels of the autonomous vehicle; and wherein the controller is further configured to:
- characterize time series relationships among the one or more additional regularly repeating patterns and the first and second regularly repeating patterns; and
- determine the vehicle is moving in the second direction by analyzing the additional regularly repeating patterns and the first and second regularly repeating patterns during the second time window to identify shifts in one or more of the characterized time series relationships corresponding to a reversal in rotation direction of the first wheel, the second wheel, and the one or more additional wheels.

16. The autonomous vehicle system according to claim 10, wherein the controller is further configured to:
- responsive to the frequency of the first and second regularly repeating patterns indicating a vehicle speed below a threshold value, repetitively analyze the first and second data streams to characterize the time series relationship between the first and second regularly repeating patterns such that the time series relationship is recharacterized at least once per rotation of the first wheel.

17. A non-transitory computer readable medium storing instructions that, when executed by one or more processors in a computing device, cause the computing device to perform operations, the operations comprising:
- determining a low speed condition based on a decreasing velocity of a vehicle;
- in response to the low speed condition, receiving a first data stream from a first single channel encoder associated with a first wheel of the vehicle, the first data stream indicative of a first regularly repeating pattern with a frequency based on a rate of rotation of the first wheel;
- receiving a second data stream from a second single channel encoder associated with a second wheel of the vehicle, the second data stream indicative of a second regularly repeating pattern with a frequency based on a rate of rotation of the second wheel;
- characterizing a time series relationship between the first and second regularly repeating patterns during a first time window corresponding to motion of the vehicle in a first direction;
- during a second time window following the first time window, identifying a shift in the characterized time series relationship corresponding to a reversal in rotation direction of the first and second wheels;
- responsive to identifying the shift, determining the vehicle is moving in a second direction substantially opposite the first direction; and
- determining a time of direction reversal of the vehicle based on a timing of the identified shift.

18. The non-transitory computer readable medium according to claim 17, wherein the operations further comprise:
- determining a speed of the vehicle prior to the determined time of direction reversal and a speed of the vehicle after the determined time of direction reversal, based in part on the frequencies of the first and second regularly repeating patterns indicative of the rates of rotation of the first and second wheels, respectively; and
- determining a net displacement of the vehicle during a period that includes the determined time of reversal based on the determined speed of the vehicle while moving in the first direction, prior to the determined time of reversal, and based on the determined speed of the vehicle while moving in the second direction, following the determined time of reversal.

19. The non-transitory computer readable medium according to claim 18, wherein the operations further comprise:
- estimating a position of the vehicle based on the determined net displacement;
- identifying obstacles with the vehicle based on the estimated position;
- determining a modified path of the vehicle that avoids the identified obstacles; and
- controlling the vehicle to navigate along the modified path.

20. The non-transitory computer readable medium according to claim 17, wherein the operations further comprise:
- receiving one or more additional data streams from one or more additional single channel encoders associated with one or more additional wheels of the vehicle, wherein the one or more additional data streams are indicative of one or more additional regularly repeating patterns with frequencies based on respective rates of rotation of the one or more additional wheels of the vehicle;
- analyzing the one or more additional data streams in combination with the first and second data streams to characterize time series relationships among the one or more additional regularly repeating patterns and the first and second regularly repeating patterns; and
- wherein the determining the vehicle is moving in the second direction includes analyzing the additional regularly repeating patterns and the first and second regularly repeating patterns during the second time window to identify shifts in one or more of the characterized time series relationships corresponding to a reversal in rotation direction of the first wheel, the second wheel, and the one or more additional wheels.

* * * * *